(12) United States Patent
Takaira et al.

(10) Patent No.: US 9,994,103 B2
(45) Date of Patent: Jun. 12, 2018

(54) TRANSFER FOR FOUR-WHEEL DRIVE VEHICLE

(71) Applicant: Toyota Jidosha Kabushiki Kaisha, Toyota-shi, Aichi-ken (JP)

(72) Inventors: Koji Takaira, Okazaki (JP); Takayuki Sugimoto, Inazawa (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 191 days.

(21) Appl. No.: 15/219,905

(22) Filed: Jul. 26, 2016

(65) Prior Publication Data

US 2017/0028846 A1    Feb. 2, 2017

(30) Foreign Application Priority Data

Jul. 27, 2015    (JP) .................................. 2015-148092

(51) Int. Cl.
  *F16H 37/06*    (2006.01)
  *B60K 17/344*    (2006.01)
  (Continued)

(52) U.S. Cl.
  CPC ............ *B60K 17/346* (2013.01); *B60K 17/02* (2013.01); *B60K 17/35* (2013.01); *B60K 23/0808* (2013.01); *F16H 3/54* (2013.01); *F16H 37/065* (2013.01); *B60K 17/3467* (2013.01); *B60K 2023/0825* (2013.01);
  (Continued)

(58) Field of Classification Search
  CPC ... B60K 6/48; B60K 2006/4825; F16H 3/089; F16H 59/02
  See application file for complete search history.

(56) References Cited

U.S. PATENT DOCUMENTS

| 5,199,325 | A | 4/1993 | Reuter et al. |
| 6,725,990 | B2* | 4/2004 | Bowen ................. F16D 27/115 192/21.5 |

(Continued)

FOREIGN PATENT DOCUMENTS

| JP | H05213088 A | 8/1993 |
| JP | H05305829 A | 11/1993 |

(Continued)

OTHER PUBLICATIONS

"Structure and Operation", 2012 QX56 Electronic Service Manual, Section DLN Driveline, Jul. 2011, pp. 13-16.

*Primary Examiner* — Ha Dinh Ho
(74) *Attorney, Agent, or Firm* — Dinsmore & Shohl LLP

(57) ABSTRACT

A transfer for a four-wheel drive vehicle includes a case, an input shaft, a output shaft, a output member, a friction clutch, an actuator, a pressing mechanism, a locking sleeve, a first locking sleeve driving mechanism, and a second locking sleeve driving mechanism. The second locking sleeve driving mechanism is configured to move a locking sleeve independently of the actuator and the first locking sleeve driving mechanism. The second locking sleeve driving mechanism includes a pushpin. The pushpin is configured to move in a second axial direction that is perpendicular to a first axial direction and engage with a cam groove. The pushpin is configured to move the locking sleeve toward the output member side as the locking sleeve rotates when the pushpin is engaged with the cam groove.

7 Claims, 18 Drawing Sheets

(51) Int. Cl.
   *B60K 17/346* (2006.01)
   *B60K 17/02* (2006.01)
   *F16H 3/54* (2006.01)
   *B60K 17/35* (2006.01)
   *B60K 23/08* (2006.01)
   *F16H 25/22* (2006.01)

(52) U.S. Cl.
   CPC ... *B60K 2023/0858* (2013.01); *B60Y 2306/13* (2013.01); *B60Y 2400/421* (2013.01); *B60Y 2400/422* (2013.01); *B60Y 2400/4244* (2013.01); *F16H 25/2204* (2013.01)

(56) References Cited

U.S. PATENT DOCUMENTS

| | | | | |
|---|---|---|---|---|
| 6,808,052 | B2 * | 10/2004 | Kirkwood | B60K 17/344 |
| | | | | 180/249 |
| 6,929,577 | B2 * | 8/2005 | Mueller | B60K 17/3467 |
| | | | | 475/149 |
| 7,175,557 | B2 * | 2/2007 | Kirkwood | B60K 17/3467 |
| | | | | 475/150 |
| 2007/0251345 | A1 | 11/2007 | Kriebernegg et al. | |
| 2016/0096429 | A1 | 4/2016 | Imafuku et al. | |

FOREIGN PATENT DOCUMENTS

| | | | |
|---|---|---|---|
| JP | 2000179650 A | 6/2000 | |
| JP | 2001287557 A | 10/2001 | |
| JP | 2016-074342 A | 5/2016 | |

* cited by examiner

TRANSFER FOR FOUR-WHEEL DRIVE VEHICLE

CROSS-REFERENCE TO RELATED APPLICATION(S)

This application claims priority to Japanese Patent Application No. 2015-148092 filed on Jul. 27, 2015, the entire content of which is incorporated by reference.

BACKGROUND

1. Technical Field

The present disclosure relates to a failsafe when a switching mechanism or the like to be switched to a four-wheel drive state fails, in a transfer of a four-wheel drive vehicle that is selectively switched between a two-wheel drive state and the four-wheel drive state.

2. Description of Related Art

For example, a transfer for a four-wheel drive vehicle that is provided with a high-low switching mechanism that changes the rate of rotation input from an input shaft and outputs the resultant rotation to an output shaft, a 4WD locking mechanism that connects the output shaft to an output member in an integrated manner, and a single disc or multiple disc friction clutch that adjusts transfer torque transferred from the output shaft to the output member, is well known. The transfer described in "2012 QX Electronic Service Manual" (publisher: Nissan, date of issue: July 2011, corresponding pages: DLN 13 to 16) is one such transfer. In this transfer, the switching operation of the high-low switching mechanism, the switching operation of the 4WD locking mechanism, and the torque adjustment of the friction clutch are all performed by a single motor (actuator).

SUMMARY

In a transfer for a four-wheel drive vehicle such as that described above, the transfer is selectively switched to the four-wheel drive state by a 4WD locking mechanism that switches the transfer to the four-wheel drive state, or a friction clutch or the like, but if the 4WD locking mechanism or a motor or the like fails, the transfer is unable to be switched to the four-wheel drive state, which may make it difficult to travel off-road and the like. Regarding this, it is conceivable to provide another 4WD locking mechanism independently of the motor and the 4WD locking mechanism, such that the transfer can be switched to the four-wheel drive state if the 4WD locking mechanism or motor described above were to fail. However, this would simply be doubling the 4WD locking mechanism, and if the other 4WD locking mechanism were provided, it would be necessary to provide another motor (actuator) to switch the operation of this other 4WD locking mechanism, as will be described later, which would end up increasing the size of the transfer for the four-wheel drive vehicle.

The present disclosure thus provides a transfer for a four-wheel drive vehicle that can be switched to a four-wheel drive state if a 4WD locking mechanism or an actuator fails, and that can be made suitably smaller in size that it would be if the 4WD locking mechanism were simply doubled.

A first aspect of the present disclosure relates to a transfer for a four-wheel drive vehicle, which includes a case, an input shaft, a output shaft, a output member, a friction clutch, an actuator, a pressing mechanism, a locking sleeve, a first locking sleeve driving mechanism, and a second locking sleeve driving mechanism. The input shaft is supported by the case so as to rotate with respect to the case. The output shaft is supported, concentric with the input shaft, by the case so as to rotate with respect to the case. The output shaft is configured to output power to first left and right driving wheels. The output member is supported concentric with the output shaft so as to rotate relatively with respect to the output shaft. The output member is configured to output power to second left and right driving wheels. The friction clutch is configured to transmit some of the power of the output shaft to the output member. The pressing mechanism is configured to apply engaging force to the friction clutch by output of the actuator. The locking sleeve is arranged relatively non-rotatable with respect to the output shaft. The locking sleeve is configured to move in a first axial direction along an axis of the output shaft with respect to the output shaft. The locking sleeve is configured to selectively connect to the output member by moving in the first axial direction. An outer peripheral surface of the locking sleeve includes a cam groove such that a groove width of the cam groove in a rotational direction of the locking sleeve decreases from the output shaft toward the output member. The first locking sleeve driving mechanism is configured to drive the locking sleeve toward the output member side by the output of the actuator. The second locking sleeve driving mechanism is configured to move the locking sleeve independently of the actuator and the first locking sleeve driving mechanism. The second locking sleeve driving mechanism includes a pushpin. The pushpin is configured to move in a second axial direction that is perpendicular to the first axial direction and engage with the cam groove. The pushpin is configured to move the locking sleeve toward the output member side as the locking sleeve rotates when the pushpin is engaged with the cam groove.

With the transfer for a four-wheel drive vehicle according to this aspect, if the switching mechanism such as the actuator, the first locking sleeve driving mechanism, and the friction clutch fails, the pushpin can be engaged with the cam groove formed on the outer peripheral surface of the locking sleeve using the second locking sleeve driving mechanism provided independently of the actuator and the first locking sleeve driving mechanism. As a result, even if the actuator or the 4WD locking mechanism that is driven by the actuator fails, the locking sleeve is able to be moved toward the output member side as the locking sleeve rotates, by abutting the pushpin against the inclined cam surface of the locking sleeve. Therefore, the output member and the output shaft will be connected via the locking sleeve, such that the transfer is able to be switched to the 4WD locked state, i.e., the four-wheel drive state. Also, with the second locking sleeve driving mechanism, thrust from the rotary torque of the output shaft, which moves the locking sleeve toward the output member side, is generated by abutting the pushpin against the cam groove formed on the locking sleeve. Therefore, the second locking sleeve driving mechanism is able to be suitably smaller than when additionally providing a locking mechanism that uses an actuator to generate the thrust that moves the locking sleeve in the first axial direction, for example. As a result, the size of the transfer for a four-wheel drive vehicle is able to be suitably smaller than it would be if the 4WD locking mechanism were simply doubled.

In the transfer according to the aspect described above, the actuator may be an electric motor. The pressing mechanism may include a ball screw that converts rotational motion of the electric motor to linear motion, and a piston that transmits linear motion force of the ball screw to the friction clutch. The first locking sleeve driving mechanism may include the ball screw, and a fork shaft and a fork that transmit the linear motion force of the ball screw to the locking sleeve.

With the transfer according to the structure described above, sufficient piston pressing thrust is able to be obtained by the rotational motion of the electric motor being converted into linear motion by the ball screw, and simultaneously, the locking sleeve is able to be moved toward the output member side via the fork shaft and the fork and the like by this linear motion.

In the transfer according to the structure described above, the second locking sleeve driving mechanism may include a spring that urges the pushpin in a direction toward the locking sleeve or a direction opposite the direction toward the locking sleeve, and a second actuator that selectively controls the movement of the pushpin.

With the transfer according to the structure described above, the pushpin is made to engage with the cam groove formed on the locking sleeve by operating the pushpin with the second actuator, and the pushpin is returned in the direction away from the cam groove by the urging force of the spring when the operation of the pushpin is cancelled by the second actuator. Alternatively, the pushpin is made to engage with the cam groove formed on the locking sleeve by the urging force of the spring, and the pushpin is returned in the direction away from the cam groove against the urging force of the spring by the second actuator. Thus, an actuator with suitably smaller output than an actuator that generates thrust to move the locking sleeve in the first axial direction side is able to be used as the second actuator.

In the transfer according to the structure described above, the second locking sleeve driving mechanism may include a spring that urges the pushpin in a direction opposite a direction toward the locking sleeve, and the pushpin may be provided so as to be able to be manually operated from outside the case.

With the transfer according to the structure described above, the pushpin is made to engage with the cam groove formed on the locking sleeve by manually operating the pushpin, and the pushpin is returned in the direction away from the cam groove by the urging force of the spring when the operation is cancelled. Therefore, with the second locking sleeve driving mechanism, an actuator does not need to be used, so the second locking sleeve driving mechanism can be suitably smaller.

In the transfer according to the structure described above, an inclined cam surface formed on the cam groove may be inclined such that a groove width in a rotational direction of the locking sleeve of the cam groove becomes larger farther toward an outer periphery in a radial direction of the locking sleeve.

With the transfer according to the structure described above, when the pushpin is abutted against the inclined cam surface of the cam groove formed on the locking sleeve, and the rotary torque of the output shaft is applied to the pushpin via the locking sleeve, a force in a direction away from the cam groove is applied to the pushpin by the inclined cam surface. As a result, when a relatively large force is applied to the pushpin via the locking sleeve, this pushpin is moved in a direction away from the cam groove by the inclined cam surface, so deformation of the pushpin is prevented.

In the transfer according to the structure described above, the locking sleeve may receive thrust applied in a locking direction toward the output member side from the first locking sleeve driving mechanism via a first spring, and receive thrust applied in an unlocking direction toward a side away from the output member by a second spring.

With the transfer according to the structure described above, in the first locking sleeve driving mechanism, when the locking sleeve is driven toward the output member side, the locking sleeve and the output member rotate in synchronization and are engaged by the first spring. When the locking sleeve stops being driven toward the output member side, the locking sleeve is returned from output member side by the second spring.

In the transfer according to the structure described above, the transfer may include a high-low switching mechanism that changes a rate of rotation input from the input shaft and transmits the resultant rotation to the output shaft. The first locking sleeve driving mechanism may be configured to drive the locking sleeve in conjunction with the driving of the high-low switching mechanism.

Also, with the transfer according to this structure, the transfer also includes a high-low switching mechanism that changes a rate of rotation input from the input shaft and transmits the resultant rotation to the output shaft, and the first locking sleeve driving mechanism is configured to drive the locking sleeve in conjunction with the driving of the high-low switching mechanism. Therefore, the switching operation of the high-low switching mechanism, the torque adjustment of the friction clutch, and the driving of the locking sleeve are all able to be performed by the output of the actuator.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, example embodiments of the present disclosure will be described with reference to the accompanying drawings. The drawings described in the example embodiments below have been simplified or modified as appropriate, so the scale ratios and the shapes and the like of the portions are not always accurately depicted.

Figure 1:
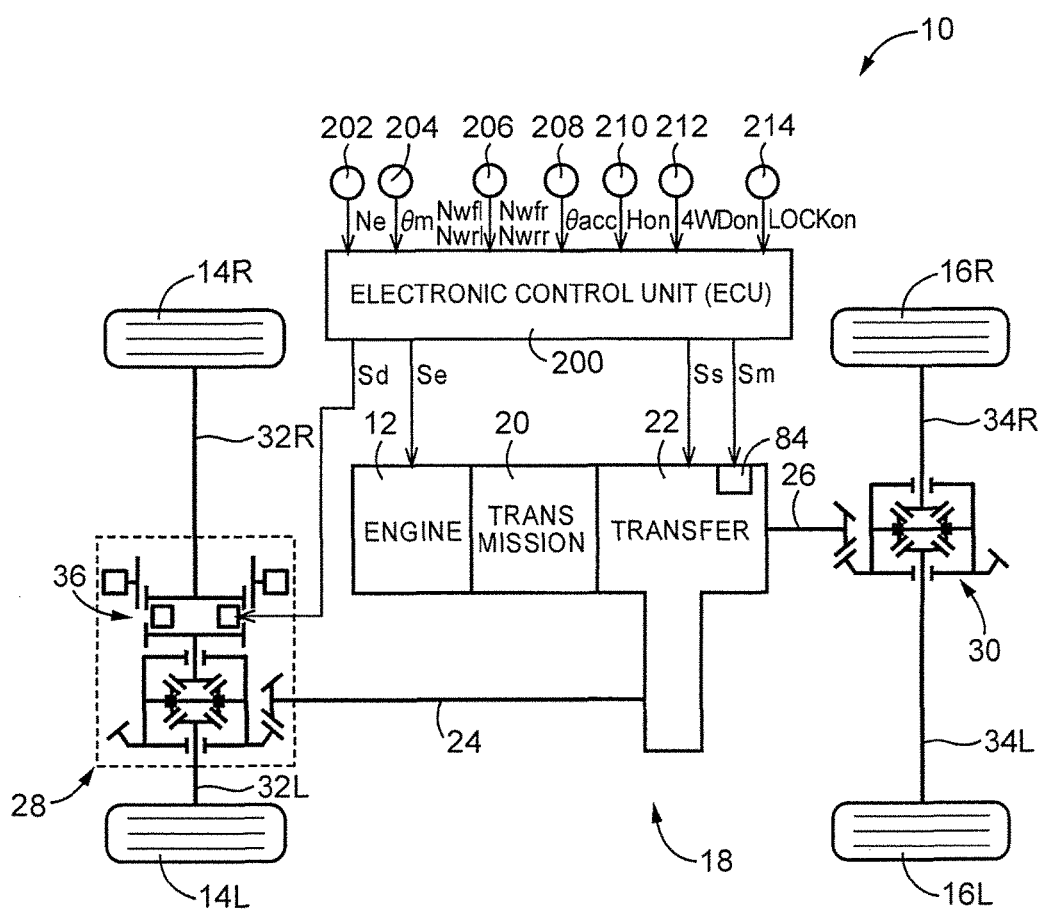
FIG. 1 is a view schematically showing the structure of a vehicle to which the present disclosure may be applied, and illustrates the main portions of a control system for various controls in the vehicle.

FIG. 1 is a view schematically showing the structure of a vehicle 10 to which the present disclosure may be applied, and illustrates the main portions of a control system for various controls in the vehicle 10. As shown in FIG. 1, the vehicle 10 includes an engine 12 as a driving force source, left and right front wheels 14L and 14R (simply referred to as "front wheels 14" unless otherwise specified), left and right rear wheels 16L and 16R (simply referred to as "rear wheels 16" unless otherwise specified), and a power transmitting apparatus 18 that transmits power from the engine 12 to the front wheels 14 and the rear wheels 16, and the like. The rear wheels 16 are main driving wheels that are driving wheels both when running in two-wheel drive (2WD) and in four-wheel drive (4WD). The front wheels 14 are auxiliary driving wheels that are driven wheels when running in 2WD and are driving wheels when running in 4WD. Therefore, the vehicle 10 is a front engine rear wheel drive (FR)-based four-wheel drive vehicle.

The power transmitting apparatus 18 includes a transmission 20, a four-wheel drive vehicle transfer 22 (hereinafter, simply referred to as "transfer 22"), a front propeller shaft 24, a rear propeller shaft 26, a front wheel differential gear unit 28, a rear wheel differential gear unit 30, left and right front wheel axles 32L and 32R (simply referred to as "front wheel axles 32" unless otherwise specified), and left and right rear wheel axles 34L and 34R (simply referred to as "rear wheel axles 34" unless otherwise specified), and the like. The transmission 20 is connected to the engine 12. The transfer 22 is a front-rear wheel power transfer that is connected to the transmission 20. The front propeller shaft 24 and the rear propeller shaft 26 are both connected to the transfer 22. The front wheel differential gear unit 28 is connected to the front propeller shaft 24. The rear wheel differential gear unit 30 is connected to the rear propeller shaft 26. The front wheel axles 32 are connected to the front wheel differential gear unit 28. The rear wheel axles 34 are connected to the rear wheel differential gear unit 30. In the power transmitting apparatus 18 structured in this way, power from the engine 12 that has been transmitted to the transfer 22 via the transmission 20 is then transmitted from the transfer 22 to the rear wheels 16 via a power transmitting path on the rear wheel side that includes the rear propeller shaft 26, the rear wheel differential gear unit 30, and the rear wheel axles 34 and the like in this order. Also, some of the power from the engine 12 that is to be transmitted to the rear wheel 16 side is distributed to the front wheel 14 side by the transfer 22, and then transmitted to the front wheels 14 via a power transmitting path on the front wheel side that includes the front propeller shaft 24, the front wheel differential gear unit 28, and the front wheel axles 32 and the like in this order.

The front wheel differential gear unit 28 includes a front-side clutch 36 on the front wheel axle 32R side (i.e., between the front wheel differential gear unit 28 and the front wheel 14R). The front-side clutch 36 is a mesh-type clutch that is electrically (electromagnetically) controlled and selectively establishes or interrupts the power transmitting path between the front wheel differential gear unit 28 and the front wheel 14R. The front-side clutch 36 may also be provided with a synchronizing mechanism (synchro mechanism).

Figure 2:
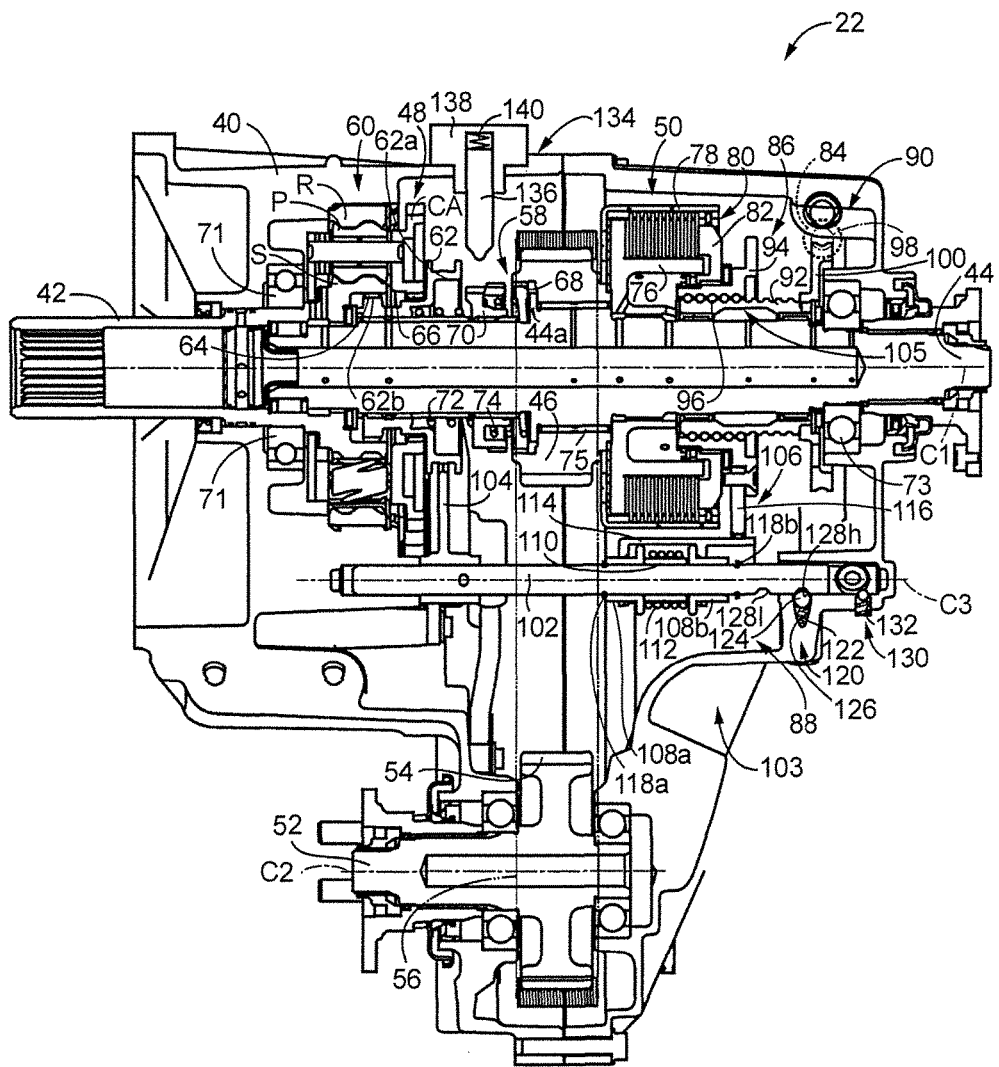
FIG. 2 is a sectional view schematically showing the structure of a transfer, and illustrates the manner for switching to a 4WD running state in a high-speed side gear.
Figure 3:
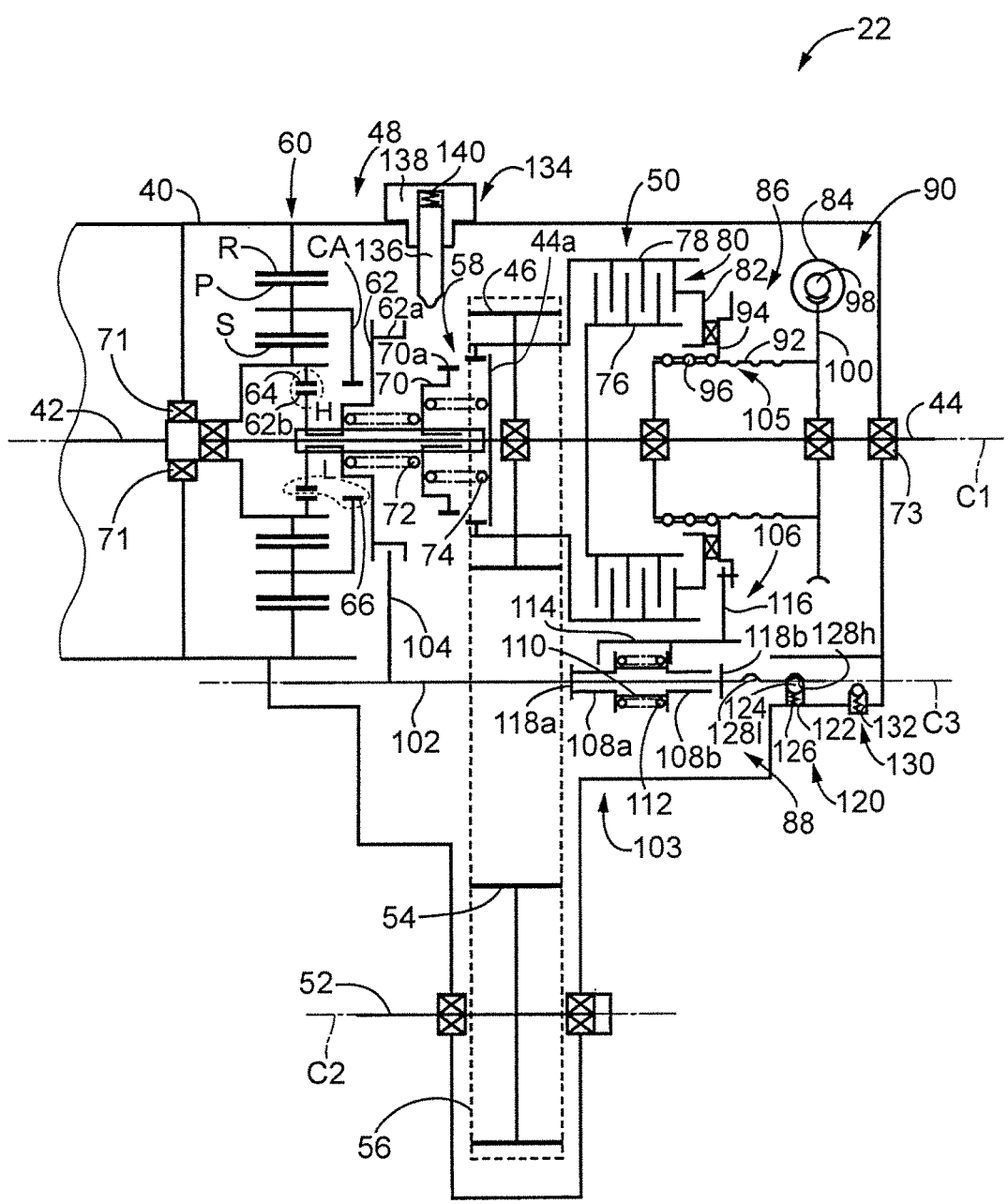
FIG. 3 is a skeleton view schematically showing the structure of the transfer.

FIGS. 2 and 3 are views schematically showing the structure of the transfer 22. FIG. 2 is a sectional view of the transfer 22, and FIG. 3 is a skeleton view of the transfer 22. As shown in FIGS. 2 and 3, the transfer 22 includes a transfer case 40 as a non-rotating member. The transfer 22 includes, all around a common axis (a first axis) C1, an input shaft 42 rotatably supported by the transfer case 40, a rear-wheel side output shaft (a output shaft) 44 that outputs power to the rear wheels 16 as first left and right driving wheels, a sprocket-shaped drive gear (a output member) 46 that outputs power to the front wheels 14 as second left and right driving wheels, a high-low switching mechanism 48 as an auxiliary transmission that changes the rate of rotation input from the input shaft 42 and transmits the resultant rotation to the rear-wheel side output shaft 44, and a front-wheel drive clutch (a friction clutch) 50 as a multiple disc friction clutch that adjusts the transfer torque transmitted from the rear-wheel side output shaft 44 to the drive gear 46, i.e., that transmits some of the power from the rear-wheel side output shaft 44 to the drive gear 46. The input shaft 42 and the rear-wheel side output shaft 44 are supported by the transfer case 40 via a pair of first support bearings 71 and 73 so as to each be able to rotate around the same axis mutually. The drive gear 46 is supported by the rear-wheel side output shaft 44 via a second support bearing 75 in a manner concentric with, and rotatable relative to, the rear-wheel side output shaft 44. Also, the transfer 22 includes, inside the transfer case 40 and around a common axis C2 that is parallel to the axis C1, a front-wheel side output shaft 52, and a sprocket-shaped driven gear 54 integrally provided on the front-wheel side output shaft 52. The transfer 22 also includes, inside the transfer case 40, a front-wheel drive chain 56 that is wound around between the drive gear 46 and the driven gear 54, and a 4WD locking mechanism 58 as a dog clutch that integrally connects (i.e., locks) the rear-wheel side output shaft 44 to the drive gear 46.

The input shaft 42 is connected to an output shaft, not shown, of the transmission 20, via a coupling, and is rotatably driven by driving force (torque) input from the engine 12 via the transmission 20. The rear-wheel side output shaft 44 is a main drive shaft that is connected to the rear propeller shaft 26. The drive gear 46 is provided around the rear-wheel side output shaft 44 in a manner so as to be able to rotate relative to the rear-wheel side output shaft 44. The front-wheel side output shaft 52 is an auxiliary drive shaft that is connected to the front propeller shaft 24 via a coupling, not shown.

The transfer 22 structured in this way adjusts the torque transmitted to the drive gear 46, and transmits the power transmitted from the transmission 20 to only the rear wheels 16, or to the front wheels 14 as well. Also, the transfer 22 switches between a 4WD locked state that prevents differential rotation between the rear propeller shaft 26 and the front propeller shaft 24, and a 4WD unlocked state that allows differential rotation between these, by the 4WD locking mechanism 58. Also, the transfer 22 establishes one of a high-speed side gear (a high-speed side speed) H and a low-speed side gear (a low-speed side speed) L, and changes the rate of rotation input from the transmission 20 and transmits the resultant rotation downstream. That is, the transfer 22 transmits the rotation of the input shaft 42 to the rear-wheel side output shaft 44 via the high-low switching mechanism 48. Also, when transfer torque through the front-wheel drive clutch 50 is zero and the 4WD locking mechanism 58 is released, power is not transmitted from the rear-wheel side output shaft 44 to the front-wheel side output shaft 52. On the other hand, when torque is transmitted through the front-wheel drive clutch 50 or the 4WD locking mechanism 58 is engaged, power is transmitted from the rear-wheel side output shaft 44 to the front-wheel side output shaft 52 via the drive gear 46, the front-wheel drive chain 56, and the driven gear 54.

More specifically, the high-low switching mechanism 48 includes a single pinion planetary gear set 60 and a high-low sleeve 62. The planetary gear set 60 includes a sun gear S that is connected to the input shaft 42 in a manner non-rotatable around the axis C1 with respect to the input shaft 42, a ring gear R that is arranged substantially concentric with the sun gear S and is connected, in a manner non-rotatable around the axis C1, to the transfer case 40, and a carrier CA that rotatably supports a plurality of pinion gears P that are in mesh with the sun gear S and the ring gear R, in a manner that enables the pinions gears P to revolve around the sun gear S. Accordingly, the rotation speed of the sun gear S is the same as that of the input shaft 42, and the rotation speed of the carrier CA is slower than that of the input shaft 42. High-side gear teeth 64 are fixed on an inner peripheral surface of this sun gear S, and low-side gear teeth 66 of the same diameter as the high-side gear teeth 64 are fixed on the carrier CA. The high-side gear teeth 64 are spline teeth that output rotation at the same speed as the input shaft 42 and are involved with establishing the high-speed side gear H. The low-side gear teeth 66 are spline teeth that output rotation at a slower speed than the high-side gear teeth 64 and are involved with establishing the low-speed side gear L. The high-low sleeve 62 is spline engaged with the rear-wheel side output shaft 44 in a manner able to move relative to the rear-wheel side output shaft 44 in a direction parallel to the axis C1. The high-low sleeve 62 has a fork connecting portion 62a, and outer peripheral teeth 62b that are integrally provided adjacent to the fork connecting portion 62a and mesh with the high-side gear teeth 64 and the low-side gear teeth 66 by the high-low sleeve 62 moving in the direction parallel to the axis C1 of the rear-wheel side output shaft 44. Rotation at the same speed as the rotation of the input shaft 42 is transmitted to the rear-wheel side output shaft 44 when the outer peripheral teeth 62b are in mesh with the high-side gear teeth 64, and rotation at a slower speed than the rotation of the input shaft 42 is transmitted to the rear-wheel side output shaft 44 when the outer peripheral teeth 62b are in mesh with the low-side gear teeth 66. The high-side gear teeth 64 and the high-low sleeve 62 function as a high-speed side gear clutch for establishing the high-speed side gear H, and the low-side gear teeth 66 and the high-low sleeve 62 function as a low-speed side gear clutch for establishing the low-speed side gear L. The high-low switching mechanism 48 is in a power transmission interrupted state (i.e., a neutral state) when the high-low sleeve 62 is not in mesh with either the high-side gear teeth 64 or the low-side gear teeth 66. The high-low switching mechanism 48 passes through this power transmission interrupted state when switching gears between the high-speed side gear H and the low-speed side gear L.

The 4WD locking mechanism 58 has locking teeth 68 fixed on an inner peripheral surface of the drive gear 46, and a locking sleeve 70 that is splined engaged with the rear-wheel side output shaft 44 so as to be able to move in the direction of the axis C1 with respect to the rear-wheel side output shaft 44 but unable to rotate relative to the rear-wheel side output shaft 44, and that has, fixed to an outer peripheral surface thereof, outer peripheral teeth 70a that mesh with the locking teeth 68 formed on the drive gear 46 when the locking sleeve 70 moves in the direction of the axis C1. In the transfer 22, when the 4WD locking mechanism 58 is in an engaged state in which the outer peripheral teeth 70a of the locking sleeve 70 are in mesh with the locking teeth 68, the rear-wheel side output shaft 44 and the drive gear 46 rotate together as a unit, such that 4WD locked state is established.

The high-low sleeve 62 is provided in a space on the drive gear 46 side of the first support bearing 71 provided on the input shaft 42 (more specifically, in a space on the drive gear 46 side of the planetary gear set 60). The locking sleeve 70 is provided separate from and adjacent to the high-low sleeve 62, in the space between the high-low switching mechanism 48 and the drive gear 46. The transfer 22 is provided with a preloaded first spring 72 between the high-low sleeve 62 and the locking sleeve 70. This first spring 72 is abutted against the high-low sleeve 62 and locking sleeve 70, and urges the high-low sleeve 62 and the locking sleeve 70 away from each other. The transfer 22 is also provided with a preloaded second spring 74 between the drive gear 46 and the locking sleeve 70. This second spring 74 is abutted against a protruding portion 44a of the rear-wheel side output shaft 44 and the locking sleeve 70, and urges the locking sleeve 70 toward the side away from the locking teeth 68. The urging force of the first spring 72 is set larger than the urging force of the second spring 74. The protruding portion 44a is a flange portion of the rear-wheel side output shaft 44 that is provided protruding on the locking teeth 68 side in a space on the radially inner side of the drive gear 46. The high-side gear teeth 64 are provided in a position farther away from the locking sleeve 70 than the low-side gear teeth 66 when viewed in a direction parallel to the axis C1. The outer peripheral teeth 62b of the high-low sleeve 62 mesh with the high-side gear teeth 64 on the side where the high-low sleeve 62 moves away from the locking sleeve 70 (i.e., on the left side in FIGS. 2 and 3), and mesh with the low-side gear teeth 66 on the side where the high-low sleeve 62 moves toward the locking sleeve 70 (i.e., on the right side in FIGS. 2 and 3). The outer peripheral teeth 70a of the locking sleeve 70 mesh with the locking teeth 68 on the side where the locking sleeve 70 moves toward the drive gear 46 (i.e., on the right side in FIGS. 2 and 3). Therefore, the outer peripheral teeth 70a of the locking sleeve 70 mesh with the locking teeth 68 when the high-low sleeve 62 is in the position in which the outer peripheral teeth 62b of the high-low sleeve 62 are in mesh with the low-side gear teeth 66.

The front-wheel drive clutch 50 is a multiple disc friction clutch that includes a clutch hub 76 that is connected to the rear-wheel side output shaft 44 in a manner unable to rotate relative to the rear-wheel side output shaft 44, a clutch drum 78 that is connected to the drive gear 46 in a manner unable to rotate relative to the drive gear 46, a friction engagement element 80 that is interposed between the clutch hub 76 and the clutch drum 78 and selectively engages and disengages the clutch hub 76 and the clutch drum 78, and a piston 82 that presses on the friction engagement element 80. The front-wheel drive clutch 50 is arranged around the axis C1 of the rear-wheel side output shaft 44, on the opposite side of the drive gear 46 than the high-low switching mechanism 48 in the direction of the axis C1 of the rear-wheel side output shaft 44. The friction engagement element 80 is pressed on by the piston 82 that moves toward the drive gear 46 side. The front-wheel drive clutch 50 is placed in a released state when the piston 82 is moved toward the non-pressing side (i.e., the right side in FIGS. 2 and 3) that is the side away from the drive gear 46 in a direction parallel to the axis C1, and is not abutting against the friction engagement element 80. On the other hand, the front-wheel drive clutch 50 is placed in a slip state or an engaged state by the transfer torque (torque capacity) being adjusted by the amount of movement of the piston 82, when the piston 82 is moved toward the pressing side (i.e., the left side in FIGS. 2 and 3) that is the side closer to the drive gear 46 in a direction parallel to the axis C1, and is abutting against the friction engagement element 80.

When the front-wheel drive clutch 50 is in the released state and the 4WD locking mechanism 58 is in a released state in which the outer peripheral teeth 70a of the locking sleeve 70 are not in mesh with the locking teeth 68, the power transmitting path between the rear-wheel side output shaft 44 and the drive gear 46 is interrupted such that the transfer 22 transmits the power transmitted from the transmission 20 to only the rear wheels 16. When the front-wheel drive clutch 50 is in the slip state or the engaged state, the transfer 22 distributes the power transmitted from the transmission 20 to both the front wheels 14 and the rear wheels 16. When the front-wheel drive clutch 50 is in the slip state, differential rotation is allowed between the rear-wheel side output shaft 44 and the drive gear 46, such that a differential state (4WD unlocked state) is established in the transfer 22. When the front-wheel drive clutch 50 is in the engaged state, the rear-wheel side output shaft 44 and the drive gear 46 rotate together as a unit, such that the 4WD locked state is established in the transfer 22. The front-wheel drive clutch 50 is able to continuously change the torque distribution between the front wheels 14 and the rear wheels 16 between 0:100 and 50:50, for example, by controlling the transfer torque.

The transfer 22 also includes, as an apparatus that operates the high-low switching mechanism 48, the front-wheel drive clutch 50, and the 4WD locking mechanism 58, an electric motor (actuator) 84, a screw mechanism 86 that converts the rotational motion of the electric motor 84 into linear motion, and a transmitting mechanism 88 that transmits the linear motion of the screw mechanism 86 to the high-low switching mechanism 48, the front-wheel drive clutch 50, and the 4WD locking mechanism 58.

The screw mechanism 86 is arranged around the same axis C1 as the rear-wheel side output shaft 44, and includes a threaded shaft member 92 as a rotating member that is indirectly connected to the electric motor 84 via a worm gear 90 provided in the transfer 22, and a nut member 94 as a linear motion member that is connected to the threaded shaft member 92 so as to be able to move in the direction parallel to the axis C1 as the threaded shaft member 92 rotates. The screw mechanism 86 is a ball screw in which the threaded shaft member 92 and the nut member 94 operate via multiple balls 96. The worm gear 90 is a gear pair that includes a worm 98 integrally formed on a motor shaft of the motor 84, and a worm wheel 100 that is arranged around the axis C1 and integrally formed on the threaded shaft member 92. For example, the rotation from the motor 84 that is a brushless motor is reduced in speed and transmitted to the threaded shaft member 92 via the worm gear 90. The screw mechanism 86 converts the rotation of the motor 84 transmitted to the threaded shaft member 92 into linear motion of the nut member 94.

The transmitting mechanism 88 includes a fork shaft 102 that is provided around an axis C3 that is parallel to the axis C1 of the threaded shaft member 92 and is connected to the nut member 94, and a fork 104 that is fixed on the fork shaft 102 and is connected to the high-low sleeve 62. The transmitting mechanism 88 transmits the linear motion force of the nut member 94 of the screw mechanism 86 to the high-low sleeve 62 of the high-low switching mechanism 48 via the fork shaft 102 and the fork 104. Force is applied to both the high-low sleeve 62 and the locking sleeve 70 via the first spring 72, and the locking sleeve 70 receives force from the protruding portion 44a of the rear-wheel side output shaft 44 via the second spring 74. Accordingly, the transmitting mechanism 88 transmits the linear motion force of the nut member 94 of the screw mechanism 86 to the locking sleeve 70 of the 4WD locking mechanism 58 via the high-low sleeve 62. Therefore, the first spring 72 and the second spring 74 function as members that form a portion of the transmitting mechanism 88.

A first locking sleeve driving mechanism 103 that drives the locking sleeve 70 in the direction of the axis C1 by the output of the motor 84 is provided in the 4WD locking mechanism 58 provided in the transfer 22. The first locking sleeve driving mechanism 103 includes a ball screw that is the screw mechanism 86 that converts the rotational motion of the motor 84 into linear motion, the fork shaft 102 and the fork 104 of the transmitting mechanism 88 that transmits the linear motion of this ball screw to the locking sleeve 70, the high-low sleeve 62 that is connected to the fork 104, the first spring 72 arranged in a compressed state between the high-low sleeve 62 and the locking sleeve 70, and the second spring 74 arranged in a compressed state between the locking sleeve 70 and the protruding portion 44a of the rear-wheel side output shaft 44. With the first locking sleeve driving mechanism 103 structured in this way, when the high-low sleeve 62 is moved toward the drive gear 46 side, i.e., when the outer peripheral teeth 62b the high-low sleeve 62 are moved to a position in which they mesh with the low-side gear teeth 66, via the screw mechanism 86 and the fork shaft 102 and the fork 104 of the transmitting mechanism 88 and the like by the output of the electric motor 84, the locking sleeve 70 receives thrust applied in the locking direction toward the drive gear 46 side from the first locking sleeve driving mechanism 103 via the first spring 72. As a result, the outer peripheral teeth 70a of the locking sleeve 70 are moved toward the drive gear 46 side against the urging force of the second spring 74 that is set weaker than the first spring 72, and come into mesh with the locking teeth 68 of the drive gear 46. Also, when the high-low sleeve 62 is moved toward the side away from the drive gear 46, i.e., when the outer peripheral teeth 62b of the high-low sleeve 62 are moved to a position where they mesh with the high-side gear teeth 64, via the screw mechanism 86 and the fork shaft 102 and the fork 104 of the transmitting mechanism 88 and the like by the output of the electric motor 84, from a state in which the outer peripheral teeth 62b of the high-low sleeve 62 are in mesh with the low-side gear teeth 66, thrust in a direction that unlocks the 4WD locked state, which is toward the side away from the drive gear 46, is applied to the locking sleeve 70 by the second spring 74. As a result, the locking sleeve 70 is moved toward the side away from the drive gear 46 by the urging force of the second spring 74, such that the outer peripheral teeth 70a of the locking sleeve 70 separate from the locking teeth 68 of the drive gear 46.

The screw mechanism 86 is arranged on the opposite side of the front-wheel drive clutch 50 than the drive gear 46. The piston 82 of the front-wheel drive clutch 50 is connected to the nut member 94 of the screw mechanism 86 in a manner non-movable relative to the nut member 94 in the direction parallel to the axis C1, and rotatable relative to the nut member 94 around the axis C1. Accordingly, the linear motion force of the nut member 94 of the screw mechanism 86 is transmitted to the friction engagement element 80 of the front-wheel drive clutch 50 via the piston 82. Therefore, the piston 82 is a pressing member that is connected to the nut member 94 and presses on the friction engagement element 80 of the front-wheel drive clutch 50, and functions as a member that forms a portion of the transmitting mechanism 88. In this way, the transmitting mechanism 88 transmits the linear motion force of the nut member 94 of the screw mechanism 86 to the friction engagement element 80 of the front-wheel drive clutch 50. That is, the transfer 22 is provided with a pressing mechanism 105 that applies an engaging force to the front-wheel drive clutch 50 by the output of the electric motor 84. This pressing mechanism 105 includes a ball screw that is the screw mechanism 86 that converts the rotational motion of the electric motor 84 into linear motion, and the piston 82 that transmits the linear motion force of this ball screw to the front-wheel drive clutch 50.

The transmitting mechanism 88 includes a connecting mechanism 106 that connects the nut member 94 to the fork shaft 102. The connecting mechanism 106 includes two flanged cylindrical members 108a and 108b, a cylindrical spacer 110, a third spring 112, a grasping member 114, and a connecting member 116. The two flanged cylindrical members 108a and 108b are arranged around the axis C3 and are able to slide on the fork shaft 102 in a direction parallel to the axis C3. The two flanged cylindrical members 108a and 108b are arranged such that a flange provided on one end portion of the flanged cylindrical member 108a faces a flange provided on one end portion of the flanged cylindrical member 108b. The spacer 110 is interposed between the two flanged cylindrical members 108a and 108b. The third spring 112 is arranged in a preloaded state on the outer peripheral side of the spacer 110. The grasping member 114 grasps the two flanged cylindrical members 108a and 108b in a manner that enables the two flanged cylindrical members 108a and 108b to slide in a direction parallel to the axis C3. The connecting member 116 connects the grasping member 114 to the nut member 94. The grasping member 114 slides the flanged cylindrical members 108a and 108b on the fork shaft 102 by abutting against the flanges of the flanged cylindrical members 108a and 108b. The length between the flanges of the flanged cylindrical members 108a and 108b when the flanges are both abutted against the grasping member 114 is longer than the length of the spacer 110. Therefore, the state in which the flanges are both abutted against the grasping member 114 is created by the urging force of the third spring 112.

The fork shaft 102 has stoppers 118a and 118b on an outer peripheral surface. These stoppers 118a and 118b stop the flanged cylindrical members 108a and 108b, respectively, from sliding apart in the direction parallel to the axis C3. Stopping the flanged cylindrical members 108a and 108b from sliding apart with the stoppers 118a and 118b in this way enables the transmitting mechanism 88 to transmit the linear motion force of the nut member 94 to the high-low switching mechanism 48 via the fork shaft 102 and the fork 104.

The outer peripheral teeth 70a of the locking sleeve 70 mesh with the locking teeth 68 when the fork shaft 102 is in a position that places the outer peripheral teeth 62b of the high-low sleeve 62 in mesh with the low-side gear teeth 66 (hereinafter, this position will be referred to as a "low gear position"). The friction engagement element 80 of the front-wheel drive clutch 50 is pressed on by the piston 82 when the fork shaft 102 is in a position that places the outer peripheral teeth 62b of the high-low sleeve 62 in mesh with the high-side gear teeth 64 (hereinafter, this position will be referred to as a "high gear position"). The friction engagement element 80 of the front-wheel drive clutch 50 is not pressed on by the piston 82 when the fork shaft 102 is in the low gear position.

When the fork shaft 102 is in the high gear position, the length between the flanges of the flanged cylindrical members 108a and 108b is able to be changed between the length when the flanges are both in a state abutted against the grasping member 114, and the length of the spacer 110. Therefore, the connecting mechanism 106 allows the nut member 94 to move in the direction parallel to the axis C1, between a position in which the friction engagement element 80 of the front-wheel drive clutch 50 is pressed on by the piston 82 and a position in which the friction engagement element 80 of the front-wheel drive clutch 50 is not pressed on by the piston 82, while the fork shaft 102 remains in the high gear position.

The transfer 22 includes a gear position maintaining mechanism 120 that maintains the high gear position of the fork shaft 102, and maintains the low gear position of the fork shaft 102. The gear position maintaining mechanism 120 includes a housing hole 122, a locking ball 124, a locking spring 126, and recessed portions 128h and 128l. The housing hole 122 is formed in an inner peripheral surface of the transfer case 40 along which the fork shaft 102 slides. The locking ball 124 is housed in the housing hole 122. The locking spring 126 is housed in the housing hole 122 and urges the locking ball 124 toward the fork shaft 102 side. The recessed portions 128h and 128l are formed on an outer peripheral surface of the fork shaft 102. The recessed portion 128h receives a portion of the locking ball 124 when the fork shaft 102 is in the high gear position, and the recessed portion 128l receives a portion of the locking ball 124 when the fork shaft 102 is in the low gear position. With this gear position maintaining mechanism 120, the gear position (either the high or the low gear position) of the fork shaft 102 is able to be maintained even if output from the motor 84 is stopped in that gear position.

The transfer 22 includes a low gear position detection switch 130 that detects the low gear position of the fork shaft 102. The low gear position detection switch 130 is a ball-type contact switch, for example. The low gear position detection switch 130 is fixed in a through hole 132 formed in the transfer case 40, in a position contacting the fork shaft 102 when the fork shaft 102 has moved to the low gear position. When the low gear position is detected by the low gear position detection switch 130, an indicator for notifying a driver that the 4WD locked state is established in the low-speed side gear L is illuminated, for example.

The transfer 22 includes a second locking sleeve driving mechanism 134 capable of driving the locking sleeve 70, independently of the electric motor 84 and the first locking sleeve driving mechanism 103, as shown in FIGS. 5 to 10. This second locking sleeve driving mechanism 134 includes a cam groove 70c, a longitudinal flat plate-shaped pushpin 136, a housing 138, a spring 140, and a pair of solenoids (actuators) (i.e., a first solenoid (first actuator) 142 and a second solenoid (second actuator) 144). The cam groove 70c is formed on an outer peripheral surface 70b of the locking sleeve 70. The pushpin 136 moves the locking sleeve 70 toward the drive gear 46 side as the locking sleeve 70 rotates, by engaging with the cam groove 70c. The housing 138 is fixed to the transfer case 40, and has a housing hole 138a that houses the pushpin 136 in a manner that allows the pushpin 136 to move in the direction of an axis (second axis) C4 that is perpendicular to the axis C1. The spring 140 is arranged in a compressed state between a bottom surface 138b of the housing hole 138a and an end portion of the pushpin 136 that is on the opposite side from the locking sleeve 70 side, inside the housing hole 138a of the housing 138. This spring 140 urges the pushpin 136 in a direction toward the locking sleeve 70. The first solenoid 142 and the second solenoid 144 selectively control the movement of the pushpin 136 in the direction of the axis C4. Although not shown, the pair of solenoids, i.e., the first solenoid 142 and the second solenoid 144, is integrally fixed to the housing 138. Also, the pushpin 136, the housing 138, the spring 140, and the pair of solenoids, i.e., the first solenoid 142 and the second solenoid 144, that are all provided in the second locking sleeve driving mechanism 134 are arranged on the outer peripheral side of the locking sleeve 70, and a portion of the second locking sleeve driving mechanism 134 is arranged in an open space formed on the outer peripheral side of the locking sleeve 70 inside the transfer 22. Therefore, an increase in size of the transfer 22 due to the second locking sleeve driving mechanism 134 being provided is able to be suitably inhibited.

Figure 6:
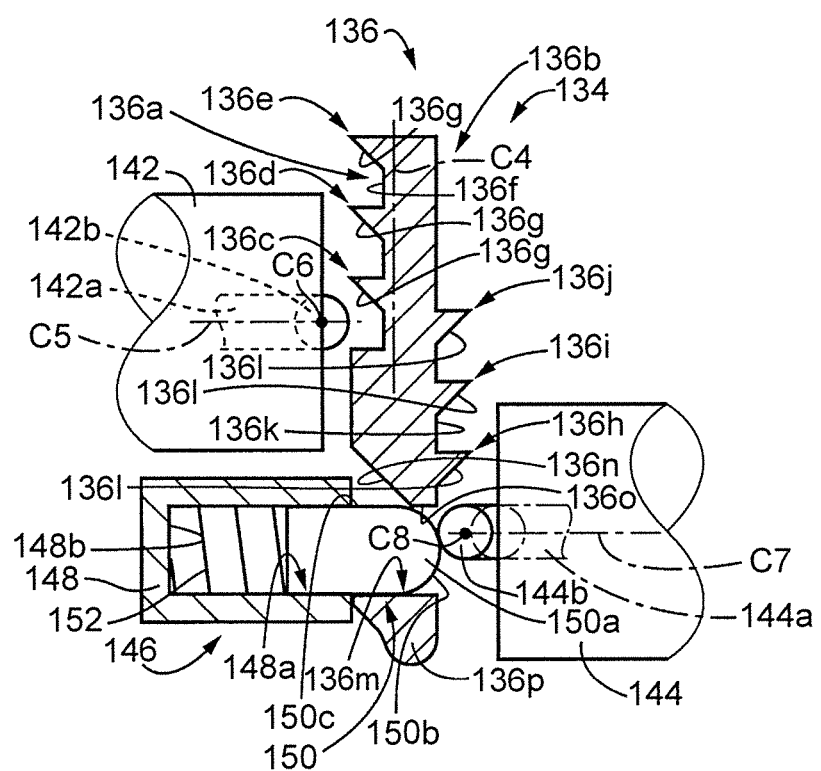
FIG. 6 is a sectional view taken along line VI-VI in FIG. 5.
Figure 7:
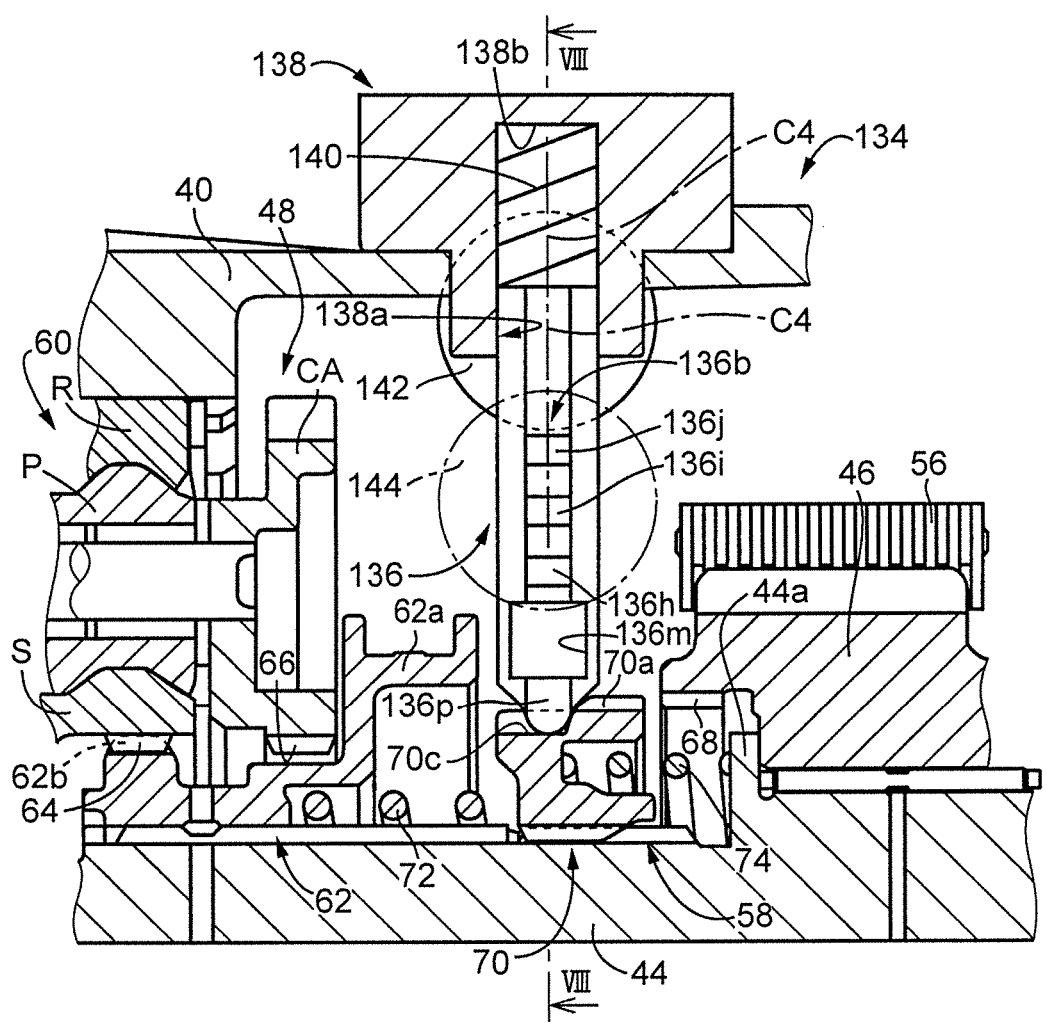
FIG. 7 is a sectional view illustrating the second locking sleeve driving mechanism provided in the transfer shown in FIGS. 2, 3, and 4, and shows a state in which a pushpin provided in this second locking sleeve driving mechanism is engaged in a cam groove of a locking sleeve.
Figure 8:
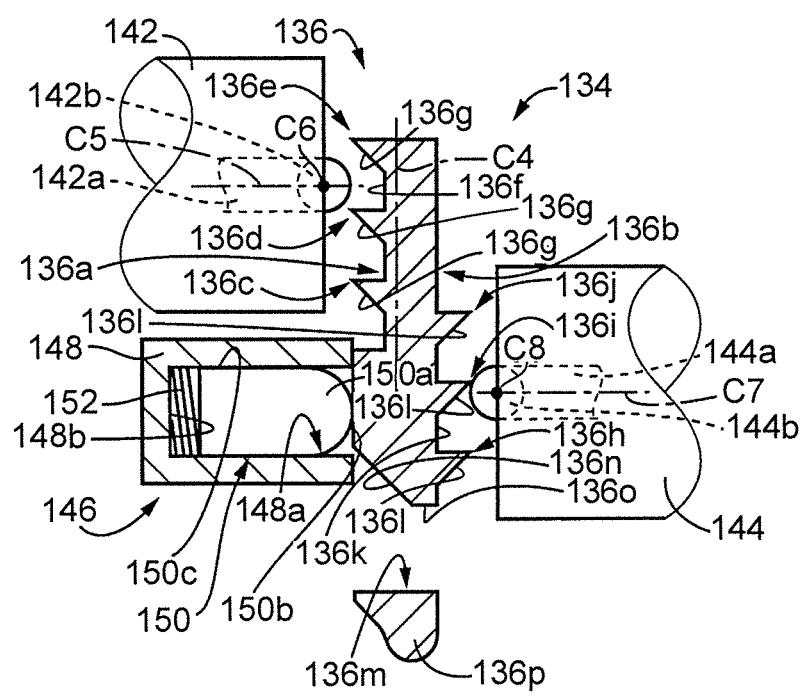
FIG. 8 is a sectional view taken along line VIII-VIII in FIG. 7.
Figure 9:
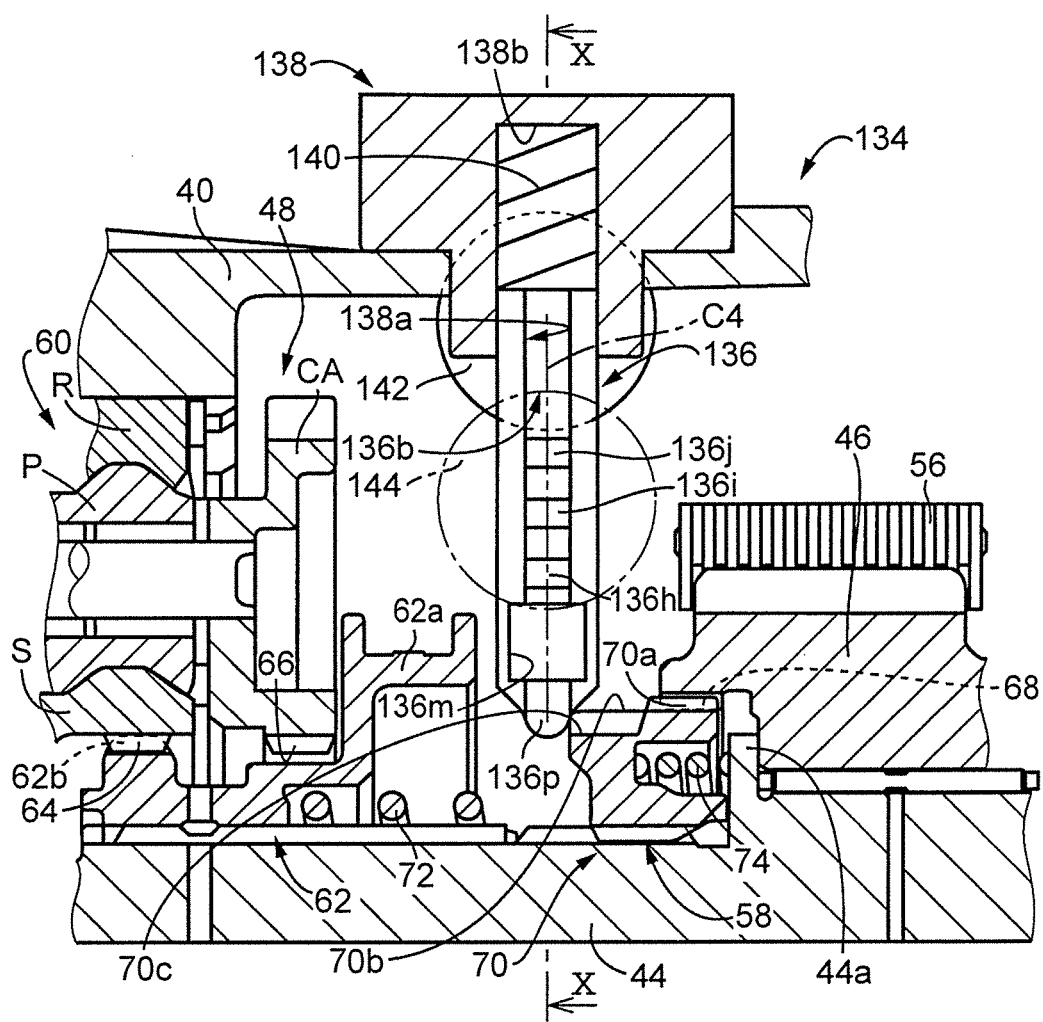
FIG. 9 is a sectional view illustrating the second locking sleeve driving mechanism provided in the transfer shown in FIGS. 2, 3, and 4, and shows a state in which the locking sleeve is moved toward a output member side by the pushpin provided in this second locking sleeve driving mechanism.
Figure 10:
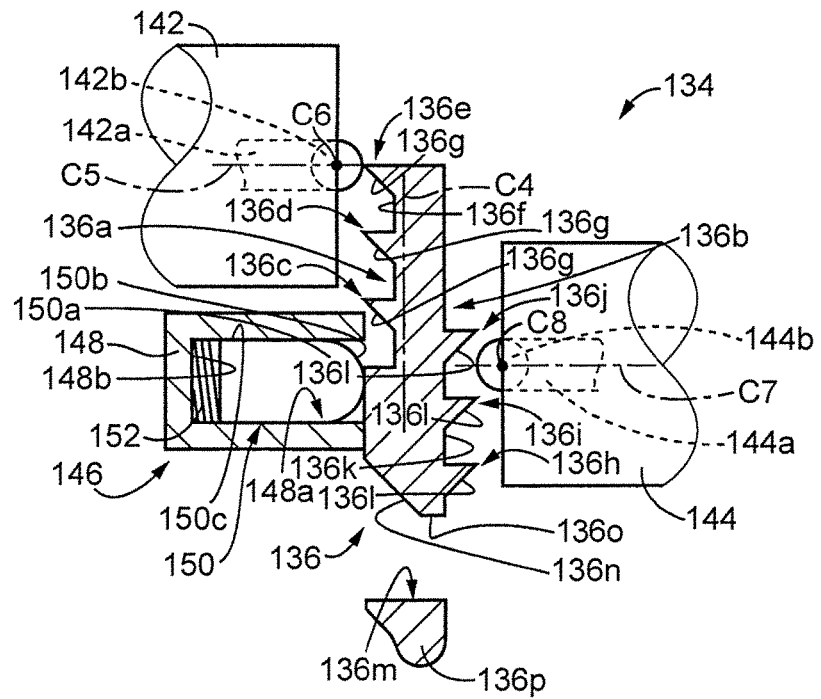
FIG. 10 is a sectional view taken along line X-X in FIG. 9.

A pair of longitudinal grooves, i.e., a first longitudinal groove 136a and a second longitudinal groove 136b, that extend in the longitudinal direction of the pushpin 136 are formed on the pushpin 136, as shown in FIGS. 5 to 10. A first protrusion 136c, a second protrusion 136d, and a third protrusion 136e are formed in a row in a saw-tooth shape on a first bottom surface 136f of the first longitudinal groove 136a on the first solenoid 142 side, from among the pair of longitudinal grooves, i.e., the first longitudinal groove 136a and the second longitudinal groove 136b, formed on the pushpin 136, as shown in FIGS. 6, 8, and 10. The first protrusion 136c protrudes out in a direction toward the first solenoid 142. The second protrusion 136d is arranged on the side away from the locking sleeve 70 with respect to the first protrusion 136c, and protrudes out in a direction toward the first solenoid 142. The third protrusion 136e is arranged on a side away from the locking sleeve 70 with respect to the second protrusion 136d, and protrudes out in a direction toward the first solenoid 142. An inclined surface 136g that is inclined so as to come closer to the first solenoid 142 farther toward the side away from the locking sleeve 70 in the direction of the axis C4 is formed on each of the first protrusion 136c, the second protrusion 136d, and the third protrusion 136e. The first solenoid 142 includes a shaft-like first shaft member 142a and a disc member 142b. The first shaft member 142a is moved in the direction of an axis C5 that is orthogonal to the axis C4 by the first solenoid 142 being switched between an ON state and an OFF state in response to a drive signal supplied from an electronic control unit (ECU) 200 that will be described later. The disc member 142b is rotatably supported around an axis C6 that is orthogonal to the axis C5, on a tip end portion of the first shaft member 142a. When the first solenoid 142 is in the ON state, the disc member 142b of the first shaft member 142a is moved toward the pushpin 136 side in the direction of the axis C5 so as to abut against the first bottom surface 136f of the first longitudinal groove 136a formed on the pushpin 136. When the first solenoid 142 is in the OFF state, the disc member 142b of the first shaft member 142a is moved toward the side opposite the pushpin 136 side in the direction of the axis C5 so as not to engage with the first protrusion 136c, the second protrusion 136d, or the third protrusion 136e formed in the first longitudinal groove 136a.

Also, a fourth protrusion 136h, a fifth protrusion 136i, and a sixth protrusion 136j are formed in a row in a saw-tooth shape on a second bottom surface 136k of the second longitudinal groove 136b on the second solenoid 144 side, from among the pair of longitudinal grooves, i.e., the first longitudinal groove 136a and the second longitudinal groove 136b, formed on the pushpin 136, as shown in FIGS. 6, 8, and 10. The fourth protrusion 136h protrudes out in a direction toward the second solenoid 144. The fifth protrusion 136i is arranged on the side away from the locking sleeve 70 with respect to the fourth protrusion 136h, and protrudes out in a direction toward the second solenoid 144. The sixth protrusion 136j is arranged on a side away from the locking sleeve 70 with respect to the fifth protrusion 136i, and protrudes out in a direction toward the second solenoid 144. An inclined surface 136l that is inclined so as to come closer to the second solenoid 144 farther toward the side away from the locking sleeve 70 in the direction of the axis C4 is formed on each of the fourth protrusion 136h, the fifth protrusion 136i, and the sixth protrusion 136j. The second solenoid 144 includes a shaft-like second shaft member 144a and a disc member 144b. The second shaft member 144a is moved in the direction of an axis C7 by the second solenoid 144 being switched between an ON state and an OFF state in response to a drive signal supplied from the ECU 200 that will be described later. The disc member 144*b* is rotatably supported around an axis C8, on a tip end portion of the second shaft member 144*a*. When the second solenoid 144 is in the ON state, the disc member 144*b* of the second shaft member 144*a* is moved toward the pushpin 136 side in the direction of the axis C7 so as to abut against the second bottom surface 136*k* of the second longitudinal groove 136*b* formed on the pushpin 136. When the second solenoid 144 is in the OFF state, the disc member 144*b* of the second shaft member 144*a* is moved toward the side opposite the pushpin 136 side in the direction of the axis C7 so as not to engage with the fourth protrusion 136*h*, the fifth protrusion 136*i*, or the sixth protrusion 136*j* formed in the second longitudinal groove 136*b*.

Also, the second locking sleeve driving mechanism 134 includes a pin position changing mechanism 146 that changes the position of the pushpin 136 in the direction of the axis C4, as shown in FIGS. 6, 8, and 10. This pin position changing mechanism 146 includes a housing 148 that is fixed to the housing 138, a long stopper member 150 that is housed in a housing hole 148*a* formed in the housing 148, a coil-shaped spring 152 arranged in a compressed state between the stopper member 150 and a bottom surface 148*b* of the housing hole 148*a* of the housing 148, and a stop hole 136*m* where the stopper member 150 that is urged toward the pushpin 136 side by the urging force of the spring 152 is inserted into the pushpin 136. An inclined surface 136*n* and a parallel surface 136*o* are formed in the stop hole 136*m* of the pushpin 136. The inclined surface 136*n* is inclined so as to come closer to the housing 148 farther toward the side away from the locking sleeve 70 in the direction of the axis C4. The parallel surface 136*o* is adjacent to the inclined surface 136*n* and parallel to a line that is orthogonal to the axis C4. Also, when the stopper member 150 passes through the stop hole 136*m* of the pushpin 136, the stopper member 150 abuts against the disc member 144*b* of the second shaft member 144*a* of the second solenoid 144. Further, a curved surface 150*b* and a parallel surface 150*c* are formed on the stopper member 150. The curved surface 150*b* is curved in an arc shape at a tip end portion 150*a* of the stopper member 150. The parallel surface 150*c* is adjacent to the curved surface 150*b* and parallel to a line that is orthogonal to the axis C4. With the pin position changing mechanism 146 structured in this way, when the stopper member 150 is inserted into the stop hole 136*m* of the pushpin 136 by the urging force of the coil-shaped spring 152, the parallel surface 150*c* of the stopper member 150 abuts against the parallel surface 136*o* formed in the stop hole 136*m*, and the pushpin 136 is supported by the housing 148 via the stopper member 150, so the moving position of the pushpin 136 in the direction of the axis C4 is kept at a position farthest away from the locking sleeve 70, as shown on the right in FIG. 16. Also, the disc member 142*b* of the first shaft member 142*a* of the first solenoid 142 changes the moving position of the pushpin 136 in the direction of the axis C4 by abutting against one of the first protrusion 136*c*, the second protrusion 136*d*, and the third protrusion 136*e* formed in the first longitudinal groove 136*a* of the pushpin 136, as shown on the left in FIG. 15, and the left and right in FIG. 16, so the first solenoid 142, and the first protrusion 136*c*, the second protrusion 136*d*, and the third protrusion 136*e* formed in the first longitudinal groove 136*a* of the pushpin 136 function as members that form the pin position changing mechanism 146. Also, the disc member 144*b* of the second shaft member 144*a* of the second solenoid 144 also changes the moving position of the pushpin 136 in the direction of the axis C4 by abutting against one of the fourth protrusion 136*h*, the fifth protrusion 136*i*, and the sixth protrusion 136*j* formed in the second longitudinal groove 136*b* of the pushpin 136, as shown on the right in FIG. 14, the right in FIG. 15, and the center in FIG. 16, so the second solenoid 144, and the fourth protrusion 136*h*, the fifth protrusion 136*i*, and the sixth protrusion 136*j* formed in the second longitudinal groove 136*b* of the pushpin 136 function as members that form the pin position changing mechanism 146.

Figure 16:
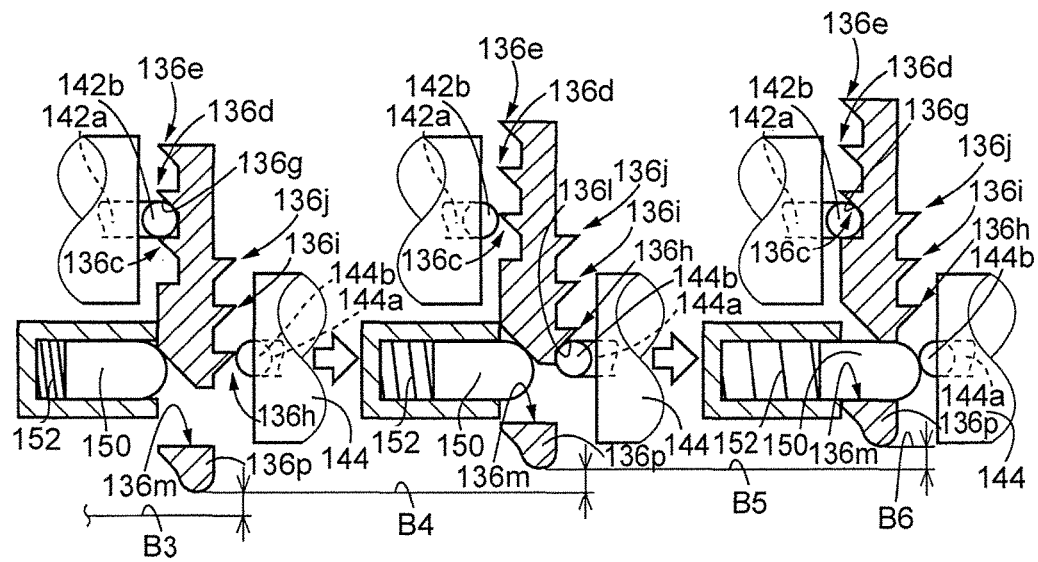
FIG. 16 is a view illustrating a method for returning the pushpin from a state in which it is thrust out so as to engage with the cam groove of the locking sleeve, to the state before the pushpin is thrust out, by moving the pushpin in a direction away from the locking sleeve.

In the second locking sleeve driving mechanism 134, when the first solenoid 142 is turned OFF and the second solenoid 144 is turned ON such that the stopper member 150 is moved toward the housing 148 side against the urging force of the spring 152 from the state shown on the right in FIG. 16 in which the moving position of the pushpin 136 in the direction of axis C4 is maintained in the position farthest from the locking sleeve 70, by the pin position changing mechanism 146, the curved surface 150*b* of the tip end portion 150*a* of the stopper member 150 abuts against the inclined surface 136*n* of the stop hole 136*m*, and the stopper member 150 is moved toward the housing hole 148*a* side of the housing 148 along the inclined surface 136*n* by the urging force of the spring 140 as shown in the center in FIG. 16. The pushpin 136 engages with the cam groove 70*c* formed on the locking sleeve 70, as shown in FIGS. 7 and 8, by the urging force of the spring 140.

Figure 11:
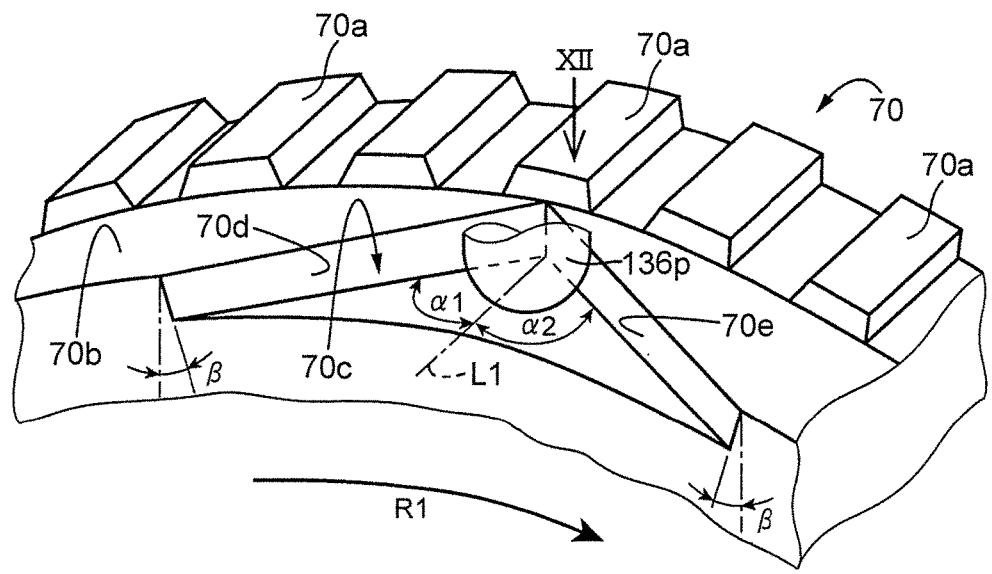
FIG. 11 is a perspective view of a state in which a tip end portion of the pushpin is engaged with the cam groove of the locking sleeve.
Figure 12:
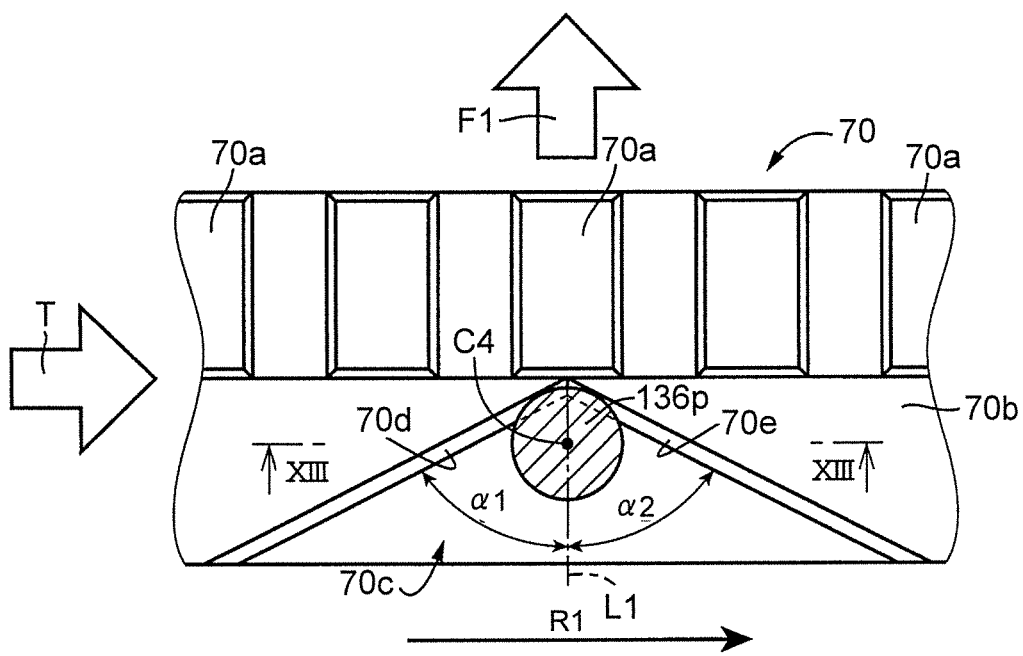
FIG. 12 is a view of FIG. 11 from the direction of arrow XII.
Figure 13:
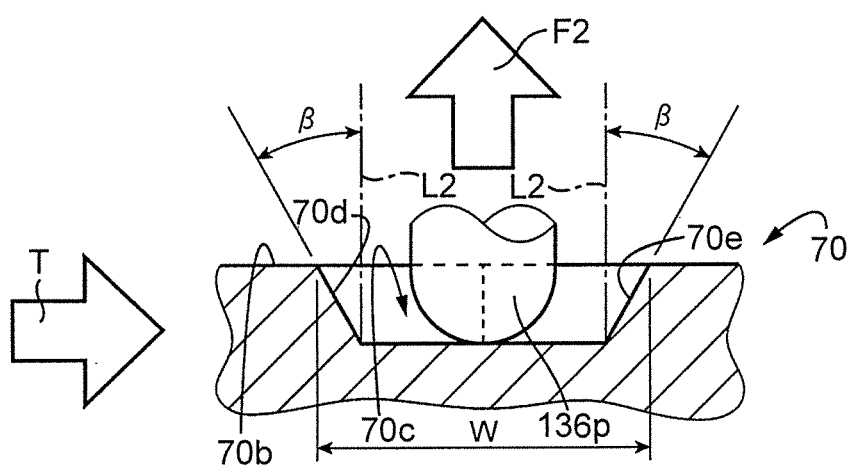
FIG. 13 is a sectional view taken along line XIII-XIII in FIG. 12.

FIGS. 11 to 13 are views showing a state in which a tip end portion of the pushpin 136 is engaged with the cam groove 70*c* of the locking sleeve 70. As shown in FIGS. 11 and 12, outer peripheral teeth 70*a* are formed on the drive gear 46 side of the outer peripheral surface 70*b* of the locking sleeve 70, and the cam groove 70*c* is formed on the opposite side from the drive gear 46. A first inclined cam surface (inclined cam surface) 70*d* and a second inclined cam surface 70*e* are formed on the cam groove 70*c* that is formed on the outer peripheral surface 70*b* of the locking sleeve 70. The first inclined cam surface 70*d* is inclined by an angle α1 such that a groove width W in the rotational direction of the locking sleeve 70 decreases toward the drive gear 46 side. That is, the first inclined cam surface 70*d* is inclined by the angle α1 toward the drive gear 46 side, i.e., toward the outer peripheral teeth 70*a* side of the locking sleeve 70, farther in the forward rotational direction of the locking sleeve 70 when the vehicle 10 is traveling forward, i.e., farther in the forward rotational direction R1. The second inclined cam surface 70*e* is adjacent to the first inclined cam surface 70*d* and is inclined by an angle α2 toward the opposite side from the drive gear 46 side, farther in the forward rotational direction R1 of the locking sleeve 70. Also, as shown in FIG. 13, the first inclined cam surface 70*d* and the second inclined cam surface 70*e* are inclined by an angle β such that the groove width, i.e., an opening width W in the circumferential direction, of the cam groove 70*c* becomes greater toward the outer periphery in the radial direction of the locking sleeve 70.

When a tip end portion 136*p* of the pushpin 136 is engaged with the cam groove 70*c* of the locking sleeve 70 and abuts against the first inclined cam surface 70*d* of the cam groove 70*c* as shown in FIGS. 7 and 8, rotary torque T of the rear-wheel side output shaft 44 is converted into thrust F1 that moves the locking sleeve 70 toward the drive gear 46 side by the first inclined cam surface 70*d*, as shown in FIG. 12, and the locking sleeve 70 moves toward the drive gear 46 side by this thrust F1 such that the outer peripheral teeth 70*a* of the locking sleeve 70 mesh with the locking teeth 68 of the drive gear 46. Also, when the vehicle 10 is traveling in reverse and the tip end portion 136*p* of the pushpin 136 is engaged with the cam groove 70*c* of the locking sleeve 70, the tip end portion 136*p* of the pushpin 136 abuts against the second inclined cam surface 70e of the cam groove 70c, and the rotary torque T of the rear-wheel side output shaft 44 is converted into thrust F1 that moves the locking sleeve 70 toward the drive gear 46 side, just as described above. The conversion equation (1) by which rotary torque T is converted into thrust F1 by the first inclined cam surface 70d or the second inclined cam surface 70e is shown below. The angle α1 is an angle between a straight line L1 that is parallel to the axis C1 and the first inclined cam surface 70d, and the angle α2 is an angle between the straight line L1 and the second inclined cam surface 70e. In this example embodiment, the angle α1 and the angle α2 are the same angle α.

$$F1 = T/R2 \times (1/\tan \alpha) \quad (1)$$

where R2 is the distance from the axis C1 to a point where the first inclined cam surface 70d or the second inclined cam surface 70e abuts against the tip end portion 136p of the pushpin 136.

Also, when tip end portion 136p of the pushpin 136 is engaged with the cam groove 70c of the locking sleeve 70 and is abutted against the first inclined cam surface 70d of the cam groove 70c, the rotary torque T of the rear-wheel side output shaft 44 acts on the pushpin 136 via the locking sleeve 70, and a force F2 in a direction away from the cam groove 70c is generated in the pushpin 136 by an in-plane angle β that is orthogonal to the axis C1 of the first inclined cam surface 70d, as shown in FIG. 13. Also, when the vehicle 10 is traveling in reverse and the tip end portion 136p of the pushpin 136 is engaged with the cam groove 70c of the locking sleeve 70, the tip end portion 136p of the pushpin 136 abuts against the second inclined cam surface 7e of the cam groove 70c, and the force F2 in a direction away from the cam groove 70c is generated in the pushpin 136 by the rotary torque T of the rear-wheel side output shaft 44, just as described above.

Figure 14:
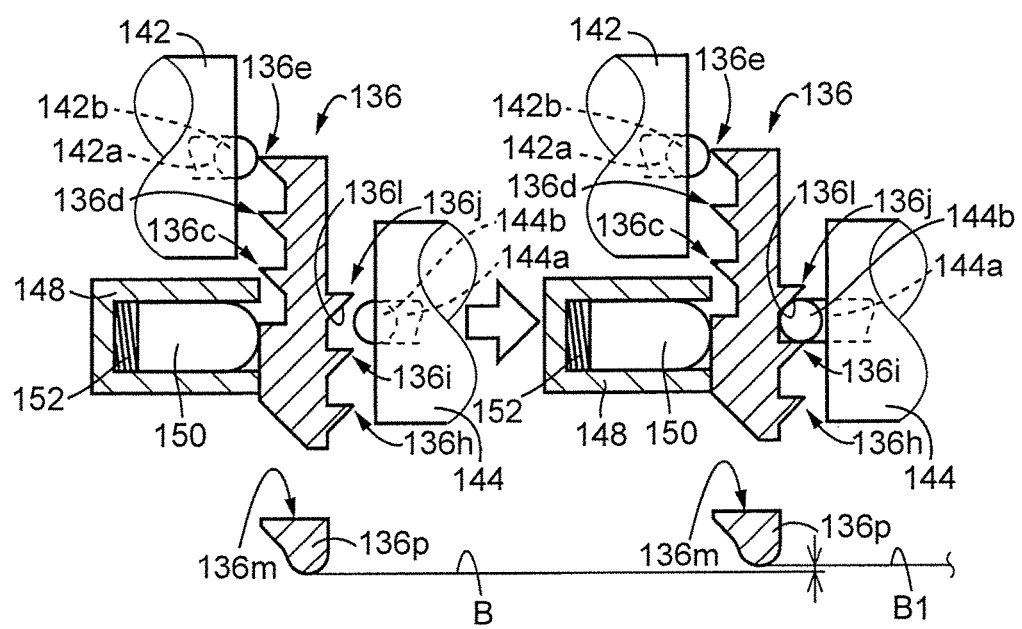
FIG. 14 is a view illustrating a method for returning the pushpin from a state in which it is thrust out so as to engage with the cam groove of the locking sleeve, to the state before the pushpin is thrust out, by moving the pushpin in a direction away from the locking sleeve.
Figure 15:
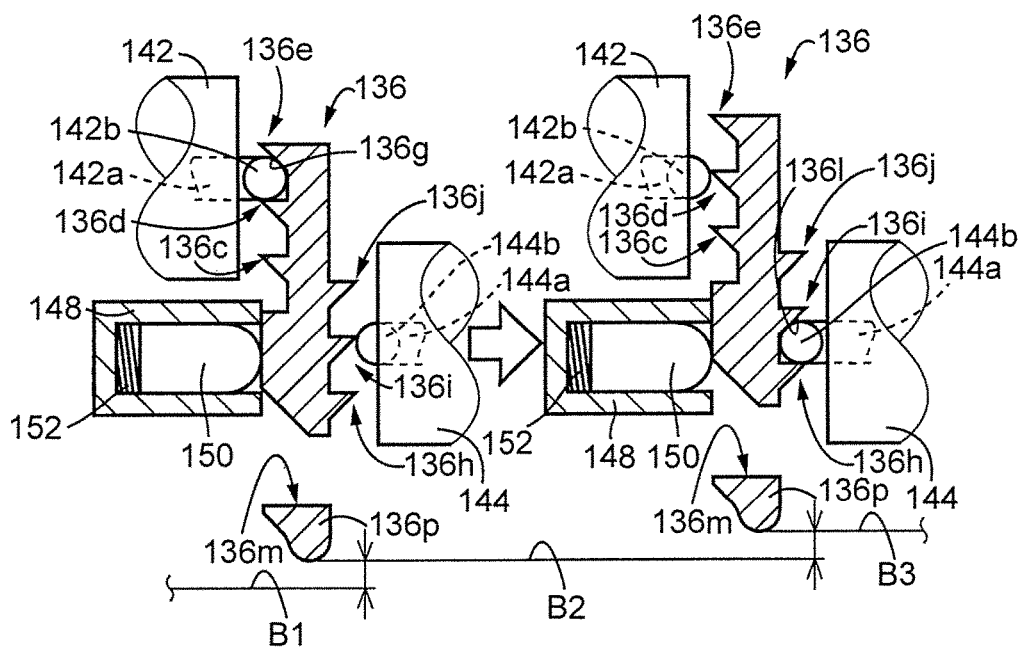
FIG. 15 is a view illustrating a method for returning the pushpin from a state in which it is thrust out so as to engage with the cam groove of the locking sleeve, to the state before the pushpin is thrust out, by moving the pushpin in a direction away from the locking sleeve.

FIGS. 14 to 16 are views illustrating a method for returning the pushpin 136 from a state in which it is thrust out so as to engage with the cam groove 70c of the locking sleeve 70, to the state before the pushpin 136 is thrust out, by the pushpin 136 being moved in a direction away from the locking sleeve 70 against the urging force of the spring 140. The left side of FIG. 14 shows a state in which the pushpin 136 is thrust out so as to engage with the cam groove 70c of the locking sleeve 70, and the outer peripheral teeth 70a of the locking sleeve 70 are placed in mesh with the locking teeth 68 of the drive gear 46 by the pushpin 136, which is the same state as that shown in FIGS. 9 and 10. As shown on the left in FIG. 14, in the state in which the outer peripheral teeth 70a of the locking sleeve 70 are in mesh with the locking teeth 68 of the drive gear 46, the tip end portion 136p of the pushpin 136 is positioned in a position closest to the rear-wheel side output shaft 44 in the second locking sleeve driving mechanism 134, i.e., in a base position B. The right side of FIG. 14 shows a state in which the second solenoid 144 is turned ON and the disc member 144b provided on the tip end portion of the second shaft member 144a is abutted against the inclined surface 136l of the sixth protrusion 136j of the pushpin 136, from the state shown on the left in FIG. 14. As shown on the right in FIG. 14, when the disc member 144b of the second shaft member 144a abuts against the inclined surface 136l of the sixth protrusion 136j of the pushpin 136, the tip end portion 136p of the pushpin 136 moves toward the side away from the locking sleeve 70 in the direction of the axis C4 by the inclined surface 136l, and rises from the base position B to a first position B1.

The left side of FIG. 15 shows a state in which the first solenoid 142 is switched from OFF to ON and the second solenoid 144 is switched from ON to OFF such that the disc member 144b of the second shaft member 144a moves away from the inclined surface 136l of the sixth protrusion 136j, and the disc member 142b of the first shaft member 142a abuts against the inclined surface 136g of the third protrusion 136e of the pushpin 136, from the state shown on the right in FIG. 14. As shown on the left in FIG. 15, when the disc member 142b of the first shaft member 142a abuts against the inclined surface 136g of the third protrusion 136e of the pushpin 136, the tip end portion 136p of the pushpin 136 moves toward the side away from the locking sleeve 70 in the direction of the axis C4 by the inclined surface 136g, and rises from the first position B1 to a second position B2. Also, the right side of FIG. 15 shows a state in which the first solenoid 142 is switched from ON to OFF and the second solenoid 144 is switched from OFF to ON such that the disc member 142b of the first shaft member 142a moves away from the inclined surface 136g of the third protrusion 136e, and the disc member 144b of the second shaft member 144a abuts against the inclined surface 136l of the fifth protrusion 136i of the pushpin 136, from the state shown on the left in FIG. 15. As shown on the right in FIG. 15, when the disc member 144b of the second shaft member 144a abuts against the inclined surface 136l of the fifth protrusion 136i of the pushpin 136, the tip end portion 136p of the pushpin 136 moves toward the side away from the locking sleeve 70 in the direct ion of the axis C4 by the inclined surface 136l, and rises from the second position B2 to a third position B3.

Also, the left side of FIG. 16 shows a state in which the first solenoid 142 is switched from OFF to ON and the second solenoid 144 is switched from ON to OFF such that the disc member 144b of the second shaft member 144a moves away from the inclined surface 136l of the fifth protrusion 136i, and the disc member 142b of the first shaft member 142a abuts against the inclined surface 136g of the second protrusion 136d of the pushpin 136, from the state shown on the right in FIG. 15. As shown on the left in FIG. 16, when the disc member 142b of the first shaft member 142a abuts against the inclined surface 136g of the second protrusion 136d of the pushpin 136, the tip end portion 136p of the pushpin 136 moves toward the side away from the locking sleeve 70 in the direction of the axis C4 by the inclined surface 136g, and rises from the third position B3 to a fourth position B4. Also, the center of FIG. 16 shows a state in which the first solenoid 142 is switched from ON to OFF and the second solenoid 144 is switched from OFF to ON such that the disc member 142b of the first shaft member 142a moves away from the inclined surface 136g of the second protrusion 136d, and the disc member 144b of the second shaft member 144a abuts against the inclined surface 136l of the fourth protrusion 136h of the pushpin 136, from the state shown on the left in FIG. 16. As shown on the center in FIG. 16, when the disc member 144b of the second shaft member 144a abuts against the inclined surface 136l of the fourth protrusion 136h of the pushpin 136, the tip end portion 136p of the pushpin 136 moves toward the side away from the locking sleeve 70 in the direction of the axis C4 by the inclined surface 136l, and rises from the fourth position B4 to a fifth position B5. Also, the right side of FIG. 16 shows a state in which the first solenoid 142 is switched from OFF to ON and the second solenoid 144 is switched from ON to OFF such that the disc member 144b of the second shaft member 144a moves away from the inclined surface 136l of the fourth protrusion 136h, and the disc member 142b of the first shaft member 142a abuts against the inclined surface 136g of the first protrusion 136c of the pushpin 136, from the state shown in the center in FIG. 16. As shown on the right in FIG. 16, when the disc member 142b of the first shaft member 142a abuts against the inclined surface 136g of the first protrusion 136c of the pushpin 136, the tip end portion 136p of the pushpin 136 moves toward the side away from the locking sleeve 70 in the direction of the axis C4 by the inclined surface 136g, and rises from the fifth position B5 to a sixth position B6. Also, when the tip end portion 136p of the pushpin 136 rises to the sixth position B6, the stopper member 150 of the pin position changing mechanism 146 passes through the stop hole 136m of the pushpin 136 and abuts against the second shaft member 144a of the second solenoid 144. The right side of FIG. 16 is a view showing the state before the pushpin 136 is thrust out.

As a result, with the second locking sleeve driving mechanism 134, when the pushpin 136 is thrust out so as to engage with the cam groove 70c of the locking sleeve 70, the pushpin 136 then moves in the direction away from the locking sleeve 70, i.e., rises and returns to the state before being thrust out, by switching the ON/OFF states of the first solenoid 142 and the second solenoid 144 and pushing on the inclined surfaces 136g and 136l formed on the first to the sixth protrusions 136c to 136j of the pushpin 136 in order, with the first shaft member 142a of the first solenoid 142 and the second shaft member 144a of the second solenoid 144.

Returning now to FIG. 1, the electronic control unit (ECU) 200 that includes a control apparatus of the vehicle 10 that switches between 2WD and 4WD, for example, is provided in the vehicle 10. The ECU 200 includes a so-called microcomputer that includes, for example, a CPU, RAM, ROM, and an input/output interface and the like. The CPU executes various controls of the vehicle 10 by processing signals according to a program stored in advance in the ROM, while using the temporary storage function of the RAM. For example, the ECU 200 executes output control of the engine 12, and switching control to switch the driving state of the vehicle 10, and the like, and is formed divided into sections for engine control and driving state control and the like as necessary. As shown in FIG. 1, various actual values based on detection signals from various sensors provided in the vehicle 10 are supplied to the ECU 200. Examples of such actual values include an engine speed Ne, a motor rotation angle θm, wheel speeds Nwfl, Nwfr, Nwrl, and Nwrr of the front wheels 14L and 14R and the rear wheels 16L and 16R, an accelerator operation amount θacc, an H-range request Hon that is a signal indicating that an H-range selector switch 210 has been operated, a 4WD request 4WDon that is a signal indicating that a 4WD selector switch 212 has been operated, and LOCKon that is a signal indicating that a 4WD lock selector switch 214 has been operated, and the like. Examples of the various sensors include an engine speed sensor 202, a motor rotation angle sensor 204, wheel speed sensors 206, an accelerator operation amount sensor 208, a H-range selector switch 210 for selecting the high-speed side gear H in response to an operation by the driver, a 4WD selector switch 212 for selecting 4WD in response to an operation by the driver, and a 4WD lock selector switch 214 for selecting the 4WD locked state in response to an operation by the driver, and the like. An engine output control command signal Se for output control of the engine 12, an operation command signal Sd for switching the state of the front-side clutch 36, a motor drive command signal Sm for controlling the rotation amount of the motor 84, and a drive signal Ss for switching the ON/OFF states of the pair of solenoids, i.e., the first solenoid 142 and second solenoid 144, that are actuators provided in the second locking sleeve driving mechanism 134, and the like are output from the ECU 200 to an output control apparatus of the engine 12, an actuator of the front-side clutch 36, the motor 84, and the transfer 22 and the like, respectively, as shown in FIG. 1.

In the vehicle 10 structured as described above, the amount of movement (i.e., the stroke) of the nut member 94 is controlled by controlling the rotation amount of the motor 84. When the fork shaft 102 is in the high gear position, the position in which the front-wheel drive clutch 50 is placed in the released state by driving the motor 84 a predetermined rotation amount to move the nut member 94 by a predetermined stroke amount toward the non-pressing side from a position in which the piston 82 is abutted against the friction engagement element 80, is a position (referred to as an "H2 position") that places the vehicle 10 in the 2WD running state in which only the rear wheels 16 are driven in the high-speed side gear H. When the front-side clutch 36 is placed in the released state when the piston 82 is in the H2 position, rotation is not transmitted from either the engine 12 side or the front wheel 14 side, to the rotating elements (e.g., the drive gear 46, the front-wheel drive chain 56, the driven gear 54, the front-wheel side output shaft 52, the front propeller shaft 24, and the front wheel differential gear unit 28) that form the power transmitting path from the drive gear 46 to the front wheel differential gear unit 28, when running in 2WD. Therefore, when running in 2WD, these rotating elements are stopped from rotating and thus are prevented from being dragged along, so running resistance is reduced.

Also, as shown in FIG. 2, when the fork shaft 102 is in the high gear position, the position in which the front-wheel drive clutch 50 is placed in the slip state by controlling the rotation amount of the motor 84 to move the nut member 94 toward the pressing side from the position where the piston 82 abuts against the friction engagement element 80, is a position (referred to as an "H4 position") that places the vehicle 10 in the 4WD running state in which power is transmitted to both the front wheels 14 and the rear wheels 16 in the high-speed side gear H. When the piston 82 is in this H4 position, torque distribution between the front wheels 14 and the rear wheels 16 is adjusted as necessary by controlling the transfer torque of the front-wheel drive clutch 50 according to the pressure of the piston 82.

Also, as shown in FIG. 2, the position in which the front-wheel drive clutch 50 is placed in the engaged state by controlling the rotation amount of the motor 84 to move the nut member 94 farther to the pressing side from the H4 position, is a position (referred to as an "H4L position") for placing the vehicle 10 in the 4WD running state in the high-speed side gear H.

Figure 4:
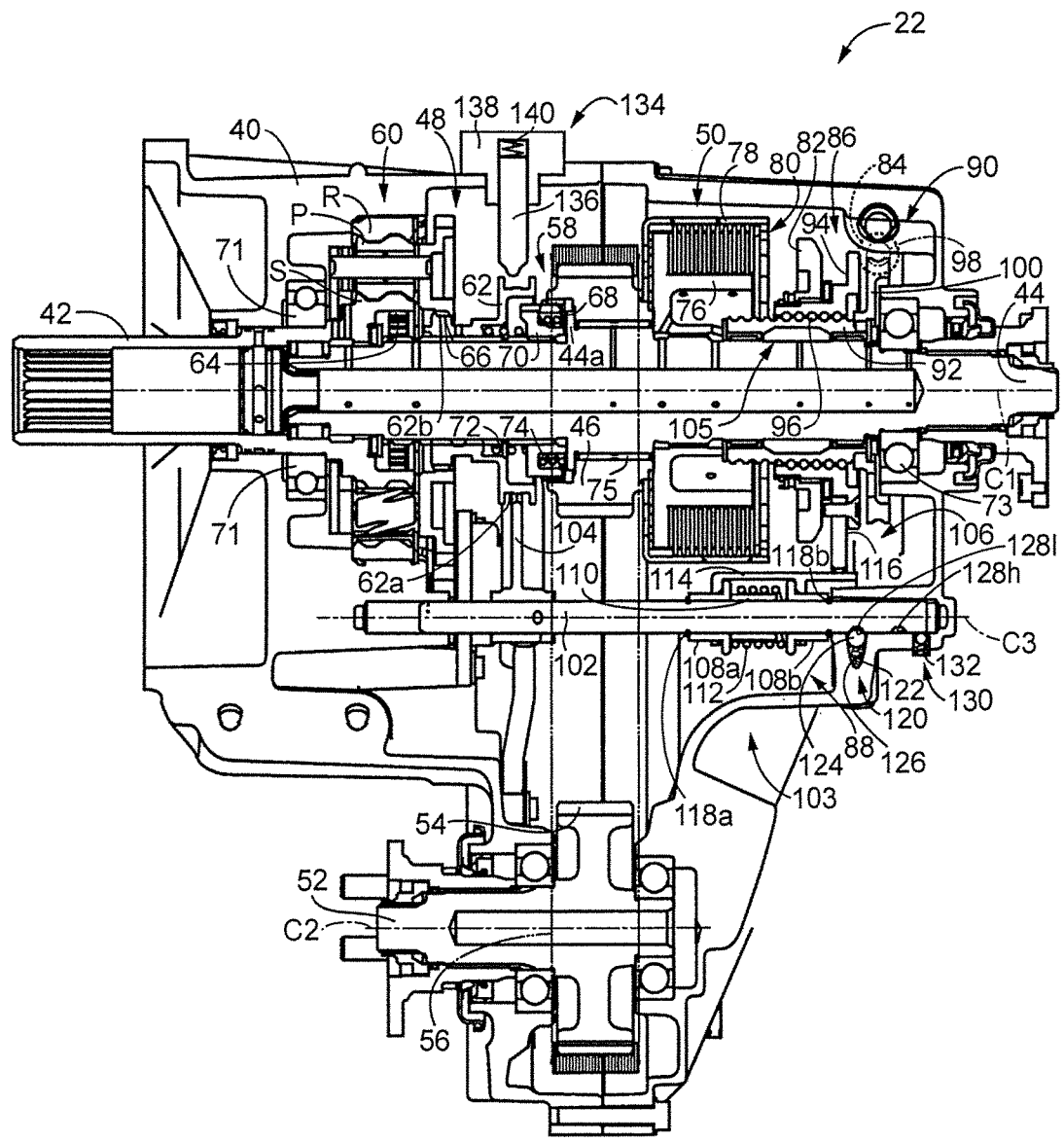
FIG. 4 is a sectional view schematically showing the structure of the transfer, and illustrates a manner for switching to the 4WD running state in a 4WD locked state in a low-speed side gear.
Figure 5:
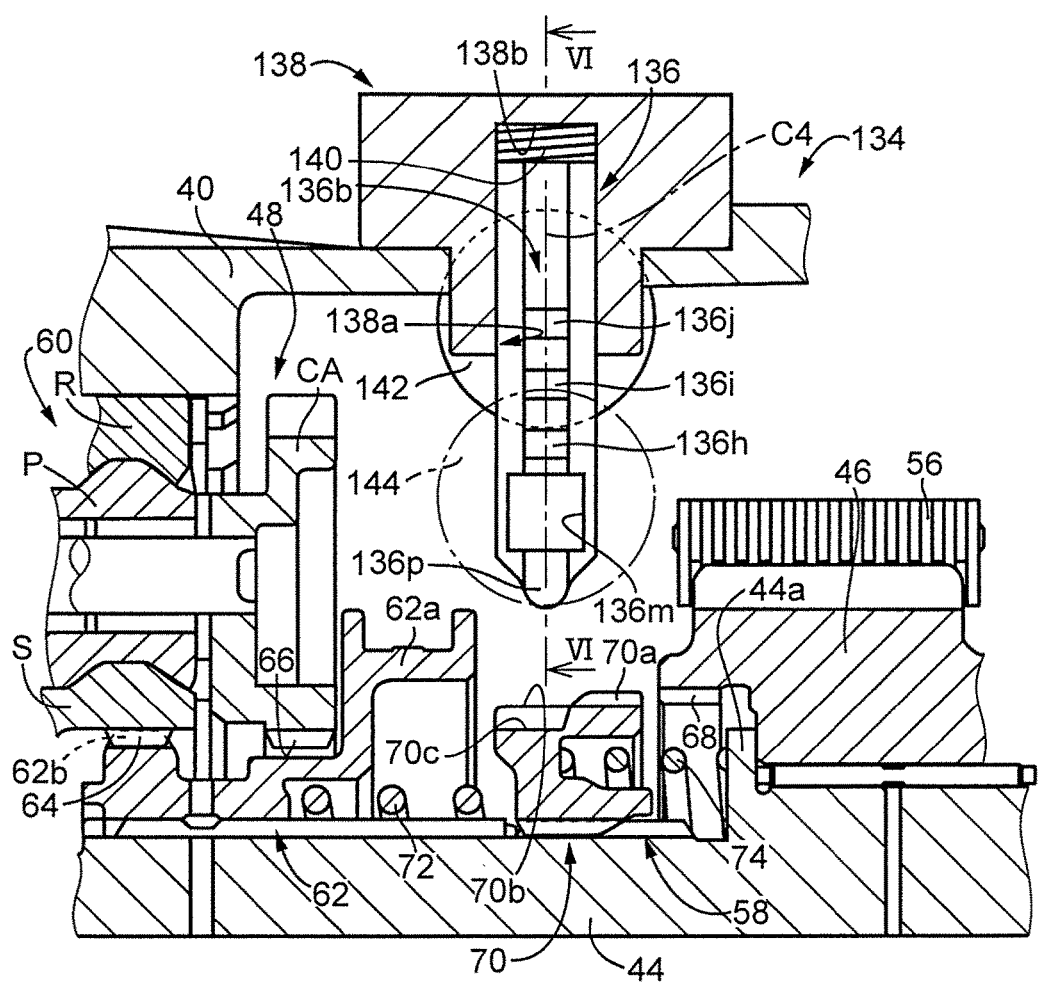
FIG. 5 is a sectional view illustrating a second locking sleeve driving mechanism provided in the transfer shown in FIGS. 2, 3, and 4.

Also, when the fork shaft 102 is in the low gear position, the front-wheel drive clutch 50 is in the released state and the 4WD locking mechanism 58 is in the engaged state, as shown in FIG. 4, so this position is a position (referred to as an "L4 position") that places the vehicle 10 in the 4WD running state in the 4WD locked state in the low-speed side gear L.

Also, if, while the vehicle 10 is traveling forward in 2WD, the electric motor 84 fails and power from the rear-wheel side output shaft 44 is unable to be transmitted to the drive gear 46 via the front-wheel drive clutch 50 or the 4WD locking mechanism 58 (the first locking sleeve driving mechanism 103 thereof) such that the vehicle 10 is unable to be switched into 4WD, for example, the ON/OFF states of the first solenoid 142 and the second solenoid 144 will be switched by the drive signal Ss supplied from the ECU 200 in the second locking sleeve driving mechanism 134, and the pushpin 136 will engage with the cam groove 70c formed on the locking sleeve 70, as shown in FIGS. 7 and 8. As a result, the tip end portion 136p of the pushpin 136 abuts against the first inclined cam surface 70d of the cam groove 70c of the locking sleeve 70, and the rotary torque T of the rear-wheel side output shaft 44 is converted into thrust F1 that moves the locking sleeve 70 toward the drive gear 46 side by the first inclined cam surface 70d, as shown in FIG. 12. The locking sleeve 70 then moves toward the drive gear 46 side by this thrust F1, and the outer peripheral teeth 70a of the locking sleeve 70 mesh with the locking teeth 68 of the drive gear 46. Therefore, even if the electric motor 84 fails, the vehicle 10 is able to be switched from 2WD to 4WD. Also, if the outer peripheral teeth 70a of the locking sleeve 70 are not in mesh with the locking teeth 68 and a relatively large force is applied to the pushpin 136 from the first inclined cam surface 70d, for example, in the middle of a switch into the 4WD state in which the tip end portion 136p of the pushpin 136 is abutting against the first inclined cam surface 70d of the cam groove 70c, the pushpin 136 will be pushed back by the first inclined cam surface 70d in a direction away from the locking sleeve 70 against the urging force of the spring 140 by this force. Then, the pushpin 136 engages with the cam groove 70c of the locking sleeve 70 again by the urging force of the spring 140, and the locking sleeve 70 is moved toward the drive gear 46 side by the pushpin 136 as described above, such that the vehicle 10 is switched into 4WD.

Also, when the vehicle 10 is to be switched from 4WD to 2WD, the ON/OFF states of the first solenoid 142 and the second solenoid 144 are switched by the drive signal Ss supplied from the ECU 200, and the inclined surfaces 136g and 136l formed on the first to sixth protrusions 136c to 136j of the pushpin 136 are pushed on in order by the first shaft member 142a of the first solenoid 142 and the second shaft member 144a of the second solenoid 144, as shown in FIGS. 14 to 16. As a result, the pushpin 136 is moved in the direction away from the locking sleeve 70, i.e., raised and returned to the state before being thrust out. Then, the locking sleeve 70 is moved in the direction away from the drive gear 46 by the urging force of the second spring 74, such that the vehicle 10 switches from 4WD to 2WD.

As described above, with this example embodiment, the cam groove 70c that has the first inclined cam surface 70d that heads toward the drive gear 46 side farther in the forward rotational direction R1 of the locking sleeve 70, is formed on the outer peripheral surface 70b of the locking sleeve 70. Further, the second locking sleeve driving mechanism 134 that moves the locking sleeve 70 independently of the electric motor 84 and the first locking sleeve driving mechanism 103 is also provided. This second locking sleeve driving mechanism 134 has the pushpin 136 that is movably provided in the direction of the axis C4 that is perpendicular to the axis C1 and moves the locking sleeve 70 toward the drive gear 46 side as the locking sleeve 70 rotates, by engaging with the cam groove 70c. Therefore, because the second locking sleeve driving mechanism 134 is provided independently of the electric motor 84 and the first locking sleeve driving mechanism 103, if the electric motor 84 fails, for example, the pushpin 136 is engaged with the cam groove 70c formed on the outer peripheral surface 70b of the locking sleeve 70 in the second locking sleeve driving mechanism 134. Thus, even if the electric motor 84 or the first locking sleeve driving mechanism 103 of the 4WD locking mechanism 58 that is driven by the electric motor 84 fails, the locking sleeve 70 will be moved toward the drive gear 46 side as the locking sleeve 70 rotates, by the pushpin 136 abutting against the first inclined cam surface 70d of the locking sleeve 70, so the drive gear 46 will be connected to the rear-wheel side output shaft 44 via the locking sleeve 70, and thus the transfer 22 will switch to the 4WD locked state, i.e., 4WD. Also, with the second locking sleeve driving mechanism 134, the thrust F1 from the rotary torque T of the rear-wheel side output shaft 44, which moves the locking sleeve 70 toward the drive gear 46 side, is generated by abutting the pushpin 136 against the cam groove 70c formed on the locking sleeve 70. Therefore, the second locking sleeve driving mechanism 134 is able to be suitably smaller than when providing a locking mechanism that uses an actuator to generate the thrust F1 that moves the locking sleeve 70 in the direction of the axis C1, for example. As a result, the size of the transfer 22 is able to be suitably smaller than if would be if the 4WD locking mechanism 58 were simply doubled.

Also, according to this example embodiment, the pressing mechanism 105 includes the screw mechanism 86 that is a ball screw that converts the rotational motion of the motor 84 into linear motion, and the piston 82 that transmits the linear motion force of the screw mechanism 86 to the front-wheel drive clutch 50, and the first locking sleeve driving mechanism 103 includes the screw mechanism 86, and the fork shaft 102 and the fork 104 that transmit the linear motion force of the screw mechanism 86 to the locking sleeve 70. Therefore, the rotational motion of the electric motor 84 is converted into linear motion by the screw mechanism 86, and the locking sleeve 70 is moved toward the drive gear 46 side via the fork shaft 102 and the fork 104 and the like by this linear motion.

Also, according to this example embodiment, the second locking sleeve driving mechanism 134 includes the spring 140 that urges the pushpin 136 in the direction toward the locking sleeve 70, and the pair of solenoids, i.e., the first solenoid 142 and the second solenoid 144, that selectively controls the movement of the pushpin 136. Therefore, the pushpin 136 is made to engage with the cam groove 70c formed on the locking sleeve 70 by the urging force of the spring 140, and the pushpin 136 is returned in the direction away from the cam groove 70c against the urging force of the spring 140 by the pair of solenoids, i.e., the first solenoid 142 and the second solenoid 144. Thus, a pair of solenoids with suitably smaller output than an actuator that generates thrust F1 to move the locking sleeve 70 toward the drive gear 46 side are able to be used as the pair of solenoids 142 and 144, i.e., the first solenoid 142 and the second solenoid 144.

Also, according to this example embodiment, the first inclined cam surface 70d formed on the cam groove 70c is inclined such that the groove width W of the cam groove 70c becomes larger toward the outer periphery in the radial direction of the locking sleeve 70. Therefore, with the second locking sleeve driving mechanism 134, when the pushpin 136 is abutted against the first inclined cam surface 70d of the cam groove 70c formed on the locking sleeve 70, and the rotary torque T of the rear-wheel side output shaft 44 is applied to the pushpin 136 via the locking sleeve 70, the force F2 in a direction away from the cam groove 70c is applied to the pushpin 136 by the first inclined cam surface 70d. As a result, when a relatively large force F2 is applied to the pushpin 136 via the locking sleeve 70, this pushpin 136 is moved in a direction away from the cam groove 70c by the first inclined cam surface 70d, so deformation of the pushpin 136 is prevented.

Also, according to this example embodiment, thrust in the locking direction toward the drive gear 46 side is applied from the first locking sleeve driving mechanism 103 via the first spring 72, and thrust in the unlocking direction toward the side away from the drive gear 46 is applied by the second spring 74. Therefore, in the first locking sleeve driving mechanism 103, when the locking sleeve 70 is driven toward the drive gear 46 side, the locking sleeve 70 and the drive gear 46 rotate in synchronization and are engaged by the first spring 72. When the locking sleeve 70 stops being driven toward the drive gear 46 side, the locking sleeve 70 is returned from drive gear 46 side by the second spring 74.

Also, according to this example embodiment, the transfer 22 also includes the high-low switching mechanism 48 that changes the rate of rotation input from the input shaft 42 and transmits the resultant rotation to the rear-wheel side output shaft 44, the screw mechanism 86 that converts the rotational motion of the electric motor 84 into linear motion, and the transmitting mechanism 88 that transmits the linear motion force of the screw mechanism 86 to both the high-low switching mechanism 48 and the front-wheel drive clutch 50. Thus, high thrust is able to be applied to the front-wheel drive clutch 50 by the high boost function of the screw mechanism 86. Also, the stroke necessary to operate the high-low switching mechanism 48 is able to be obtained by the screw mechanism 86. Therefore, the switching operation of the high-low switching mechanism 48 and the torque adjustment of the front-wheel drive clutch 50 (i.e., the adjustment of transfer torque transmitted to the drive gear 46 (in other words, the front wheels 14L and 14R)) are made possible by the one electric motor 84, the screw mechanism 86, and the transmitting mechanism 88. That is, by using the screw mechanism 86 as a conversion mechanism to convert the rotational motion of the electric motor 84 into linear motion, the switching operation of the high-low switching mechanism 48 and the torque adjustment of the front-wheel drive clutch 50 are able to be performed with the same system.

Next, another example embodiment of the present disclosure will be described. Portions common to the first example embodiment described above will be denoted by like reference characters and descriptions of these portions will be omitted.

Figure 17:
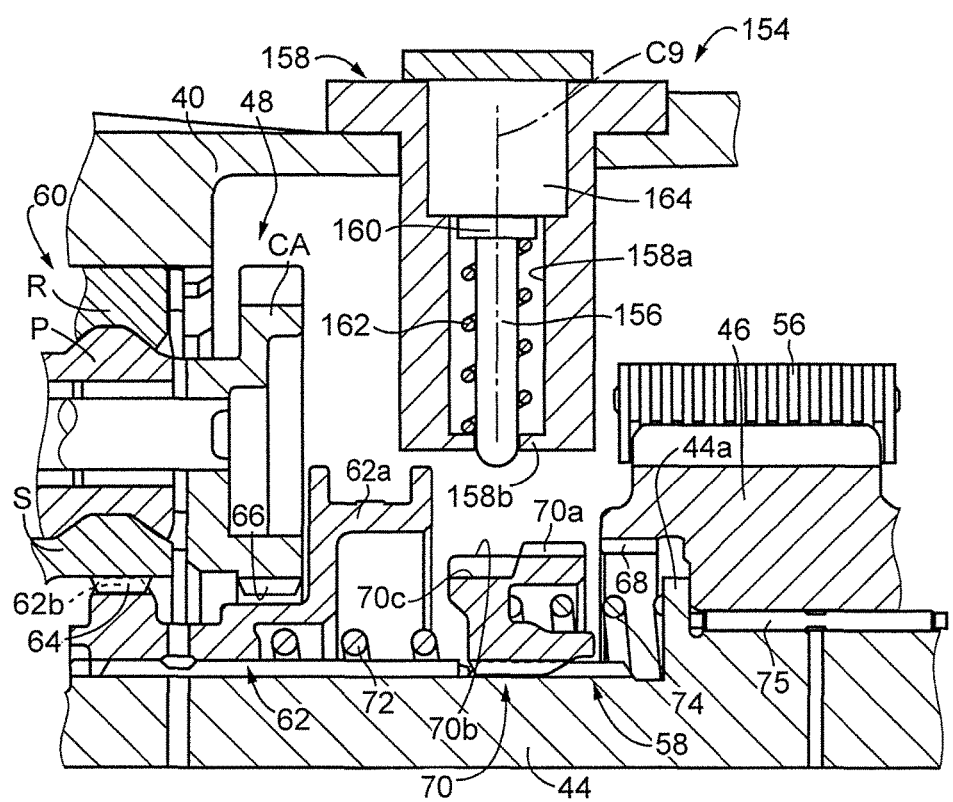
FIG. 17 is a view illustrating a second locking sleeve driving mechanism provided in a transfer according to another example embodiment of the present disclosure.
Figure 18:
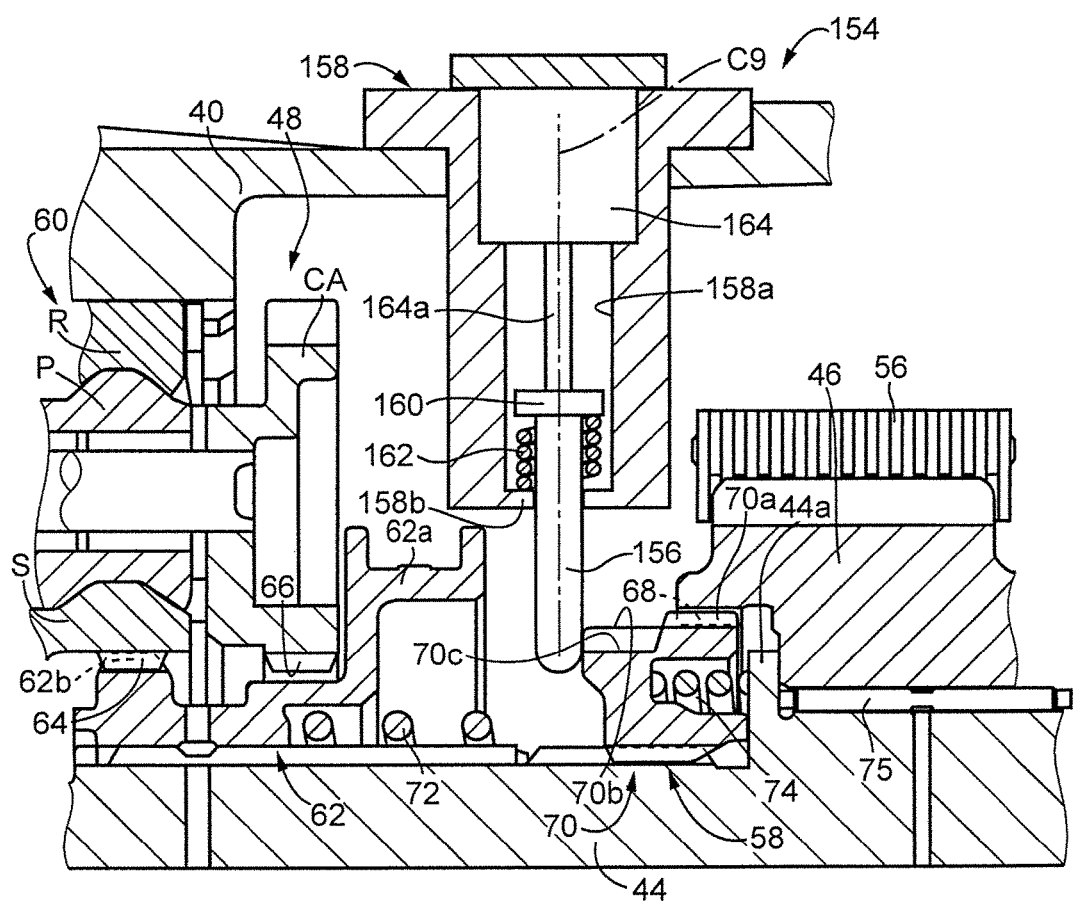
FIG. 18 is a view of a state in which a locking sleeve is moved toward a output member side by a pushpin provided in the second locking sleeve driving mechanism shown in FIG. 17.

FIGS. 17 and 18 are views illustrating a transfer (a transfer for a four-wheel drive vehicle) according to another example embodiment of the present disclosure. The transfer of this example embodiment differs from the transfer 22 of the first example embodiment in that a second locking sleeve driving mechanism 154 is different from the second locking sleeve driving mechanism 134 of the first example embodiment. Aside from this, the transfer of this example embodiment is substantially the same as the transfer 22 of the first example embodiment.

The second locking sleeve driving mechanism 154 is provided in the transfer, independently of the electric motor 84 and the first locking sleeve driving mechanism 103. The second locking sleeve driving mechanism 154 includes the cam groove 70c of the locking sleeve 70, a longitudinal pushpin 156, a housing 158, a coil-shaped spring 162, and a solenoid (a second actuator) 164. The pushpin 156 moves the locking sleeve 70 toward the drive gear 46 side by engaging with the cam groove 70c. The housing 158 is fixed to the transfer case 40, and has a housing hole 158a that houses the pushpin 156 in a manner that allows the pushpin 156 to move in the direction of an axis (second axis) C9 that is perpendicular to the axis C1. The spring 162 is arranged in a compressed state between an opening edge portion 158b of the housing hole 158a and a disc member 160 that is fixed to an end portion of the pushpin 156 that is on the opposite side from the locking sleeve 70 side, inside the housing hole 158a of the housing 158. This spring 162 urges the pushpin 156 in the opposite direction from the direction toward the locking sleeve 70. The solenoid 164 selectively controls the movement of the pushpin 156 in the direction of the axis C9.

The solenoid 164 includes a shaft-like shaft member 164a that is moved in the direction of the axis C9 by the solenoid 164 being switched between an ON state and an OFF state in response to the drive signal Ss supplied from the ECU 200, as shown in FIG. 18. When the solenoid 164 is ON, the shaft member 164a moves the disc member 160 of the pushpin 156 in a direction toward the opening edge portion 158b of the housing hole 158a of the housing 158, as shown in FIG. 18. When the solenoid 164 is OFF, the disc member 160 of the pushpin 156 moves in a direction away from the opening edge portion 158b of the housing hole 158a of the housing 158, as shown in FIG. 17.

With the second locking sleeve driving mechanism 154 structured in this way, if, while the vehicle 10 is traveling forward in 2WD, the electric motor 84 fails and power from the rear-wheel side output shaft 44 is unable to be transmitted to the drive gear 46 via the front-wheel drive clutch 50 and the first locking sleeve driving mechanism 103 of the 4WD locking mechanism 58 such that the vehicle 10 is unable to be switched into 4WD, for example, the solenoid 164 will be switched ON by the drive signal Ss supplied from the ECU 200, and the pushpin 156 will engage with the cam groove 70c of the locking sleeve 70 against the urging force of the spring 162 by the shaft member 164a. As a result, just as in the first example embodiment, a tip end portion of the pushpin 156 abuts against the first inclined cam surface 70d of the cam groove 70c of the locking sleeve 70, and the rotary torque T of the rear-wheel side output shaft 44 is converted into thrust F1 that moves the locking sleeve 70 toward the drive gear 46 side by the first inclined cam surface 70d. The locking sleeve 70 then moves toward the drive gear 46 side by this thrust F1, and the outer peripheral teeth 70a of the locking sleeve 70 mesh with the locking teeth 68 of the drive gear 46. Therefore, even if the electric motor 84 fails, the vehicle 10 is able to be switched from 2WD to 4WD. FIG. 18 is a view showing a state in which the locking sleeve 70 has been moved toward the drive gear 46 side by the pushpin 156.

Also, when switching from 4WD to 2WD, the solenoid 164 is switched OFF by the drive signal Ss supplied from the ECU 200, and the pushpin 156 is returned in the direction away from the locking sleeve 70 by the urging force of the spring 162, as shown in FIG. 17. Then, similar to the first example embodiment, the locking sleeve 70 is moved in the direction away from the drive gear 46 by the urging force of the second spring 74, such that the vehicle 10 switches from 4WD to 2WD.

As described above, according to this example embodiment, the second locking sleeve driving mechanism 154 also includes the spring 162 that urges the pushpin 156 in the opposite direction from the direction toward the locking sleeve 70, and the solenoid 164 that selectively controls the movement of the pushpin 156. Therefore, the pushpin 156 is made to engage with the cam groove 70c formed on the locking sleeve 70 by operating the pushpin 156 with the shaft member 164a of the solenoid 164, and the pushpin 156 is returned in the direction away from the cam groove 70c by the urging force of the spring 162 when the operation of the pushpin 156 is cancelled by the shaft member 164a of the solenoid 164. Thus, a solenoid with suitably smaller output than an actuator that generates thrust F1 to move the locking sleeve 70 toward the drive gear 46 side is able to be used as the solenoid 164.

FIGS. 19 to 22 are views illustrating a transfer (a transfer for a four-wheel drive vehicle) according to another example embodiment of the present disclosure. The transfer of this example embodiment differs from the transfer 22 of the first example embodiment in that a second locking sleeve driving mechanism 166 is different from the second locking sleeve driving mechanism 134 of the first example embodiment. Aside from this, the transfer of this example embodiment is substantially the same as the transfer 22 of the first example embodiment.

The second locking sleeve driving mechanism 166 is provided in the transfer, independently of the electric motor 84 and the first locking sleeve driving mechanism 103. The second locking sleeve driving mechanism 166 includes the cam groove 70c of the locking sleeve 70, a longitudinal pushpin 168, a housing 170, a coil-shaped spring 174, and a shaft-like operating shaft member 176. The pushpin 168 moves the locking sleeve 70 toward the drive gear 46 side by engaging with the cam groove 70c. The housing 170 is fixed to the transfer case 40, and has a housing hole 170a that houses the pushpin 168 in a manner that allows the pushpin 168 to move in the direction of an axis (second axis) C10 that is perpendicular to the axis C1. The spring 174 is arranged in a compressed state between an opening edge portion 170b of the housing hole 170a and a disc member 172 that is fixed to an end portion of the pushpin 168 that is on the opposite side from the locking sleeve 70 side, inside the housing hole 170a of the housing 170. This spring 174 urges the pushpin 168 in the opposite direction from the direction toward the locking sleeve 70. The operating shaft member 176 enables the pushpin 168 to be manually operated from outside the transfer case 40.

Figure 19:
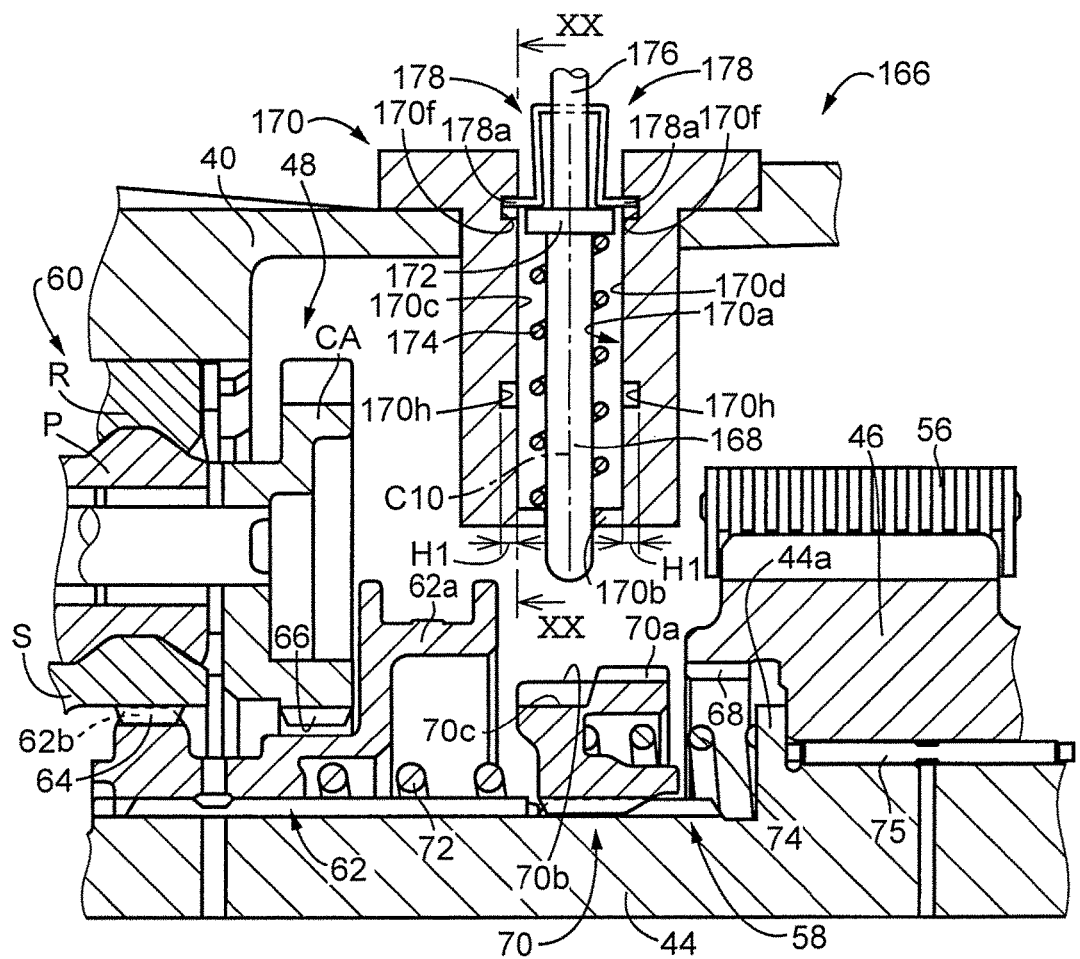
FIG. 19 is a view illustrating a second locking sleeve driving mechanism provided in a transfer according to another example embodiment of the present disclosure.
Figure 20:
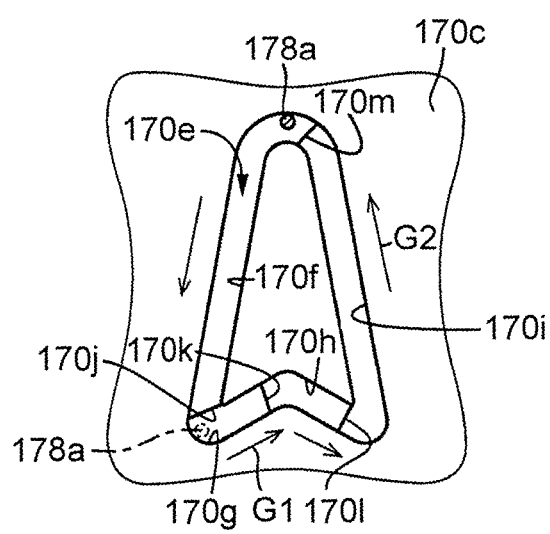
FIG. 20 is a sectional view taken along line XX-XX in FIG. 19.
Figure 22:
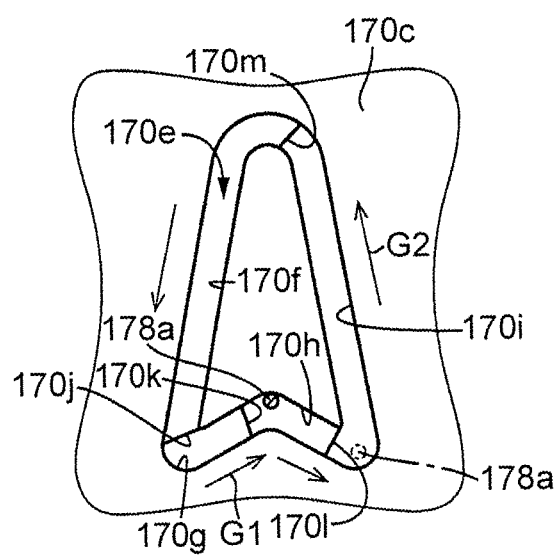
FIG. 22 is a sectional view taken along line XXII-XXII in FIG. 21.

An annular groove 170e is bored in a ring-shape in each of a pair of opposing surfaces 170c and 170d that form the housing hole 170a of the housing 170, as shown in FIGS. 20 and 22, on the housing 170. The annular groove 170e has a first groove portion 170f, a second groove portion 170g, a third groove portion 170h, and a fourth groove portion 170i, in which a groove bottom is inclined such that a depth H1 in the axis C1 direction (see FIG. 19) becomes shallower in the circumferential direction, i.e., in an advancing direction that is the direction of the arrow shown in FIGS. 20 and 20. Also, the annular groove 170e has a first step 170j formed between the first groove portion 170f and the second groove portion 170g, a second step 170k formed between the second groove portion 170g and the third groove portion 170h, a third step 170l formed between the third groove portion 170h and the fourth groove portion 170i, and a fourth step 170m formed between the fourth groove portion 170i and the first groove portion 170f. Also, a center portion of a linking member 178 in which engaging portions 178a on both ends thereof engage with the pair of annular grooves 170e, respectively, of the housing 170 is rotatably supported by the operating shaft member 176. The engaging portions 178a on both ends of the linking member 178 are urged in directions away from the opposing surfaces 170c and 170d sides, respectively. Hereinafter, portions such as the engaging portions 178a that are provided in plurality may be described in the singular to simplify the description and facilitate understanding.

In the second locking sleeve driving mechanism 166, when the operating shaft member 176 has been moved toward the rear-wheel side output shaft 44 side against the urging force of the spring 174 by a manual operation, i.e., a first push, from the state shown in FIGS. 19 and 20, and the engaging portion 178a has been moved to a position of the engaging portion 178a indicated by the dashed line in FIG. 20, and then the pressing operation of the operating shaft member 176 is cancelled, the engaging portion 178a of the linking member 178 passes over the second step 170k and is moved in the direction of the arrow G1 to the position shown in FIG. 22. At this time, when the engaging portion 178a tries to move toward the first groove portion 170f side from the position of the engaging portion 178a indicated by the dashed line in FIG. 20, it abuts against the first step 170j and is thus moved along the second groove portion 170g. Also, when the operating shaft member 176 is moved toward the rear-wheel side output shaft 44 side by a manual operation, i.e., a second push, from the state shown in FIG. 22 and the engaging portion 178a is moved to the position of the engaging portion 178a indicated by the dashed line in FIG. 22, and then the second pressing operation is cancelled, the engaging portion 178a moves in the direction of the arrow G2 with the urging force of the spring 174 to the position shown in FIGS. 19 and 20. At this time, when the engaging portion 178a tries to move toward the third groove portion 170h side from the position of the engaging portion 178a indicated by the dashed line in FIG. 22, for example, it abuts against the third step 170l and is thus moved along the fourth groove portion 170i. In the annular groove 170e, the engaging portion 178a is allowed to move in the circumferential direction, i.e., the direction of the arrows shown in FIGS. 20 and 22, but is prevented in moving in the opposite direction from the direction of the arrows shown in FIGS. 20 and 22 by the first step 170j, the second step 170k, the third step 170l, and the fourth step 170m. Also, when the operating shaft member 176 is not being operated in the second locking sleeve driving mechanism 166, the pushpin 168 tries to move in the direction away from the locking sleeve 70 by the urging force of the spring 174, as shown in FIGS. 19 to 22, but this movement is prevented by the pair of engaging portions 178a of the linking member 178 provided on the operating shaft member 176 engaging with the annular grooves 170e of the housing 170, so the pushpin 168 is retained in the position shown in FIG. 19 or 21.

With the second locking sleeve driving mechanism 166 structured in this way, if, while the vehicle 10 is traveling forward in 2WD, the electric motor 84 fails and power from the rear-wheel side output shaft 44 is unable to be transmitted to the drive gear 46 via the front-wheel drive clutch 50 and the first locking sleeve driving mechanism 103 of the 4WD locking mechanism 58 such that the vehicle 10 is unable to be switched into 4WD, for example, the pushpin 168 will be moved in the direction toward the locking sleeve 70 by the first pressing operation of the operating shaft member 176, and will engage with the cam groove 70c of the locking sleeve 70. As a result, just as in the first example embodiment, a tip end portion of the pushpin 168 abuts against the first inclined cam surface 70d of the cam groove 70c of the locking sleeve 70, and the rotary torque T of the rear-wheel side output shaft 44 is converted into thrust F1 that moves the locking sleeve 70 toward the drive gear 46 side by the first inclined cam surface 70d. The locking sleeve 70 then moves toward the drive gear 46 side by this thrust F1, and the outer peripheral teeth 70a of the locking sleeve 70 mesh with the locking teeth 68 of the drive gear 46. Therefore, even if the electric motor 84 fails, the vehicle 10 is able to be switched from 2WD to 4WD. The engaging portion 178a shown by the dashed line in FIG. 20 indicates the position of the engaging portion 178a of the linking member 178 when the transfer 22 has been switched into 4WD by the pushpin 168.

Figure 21:
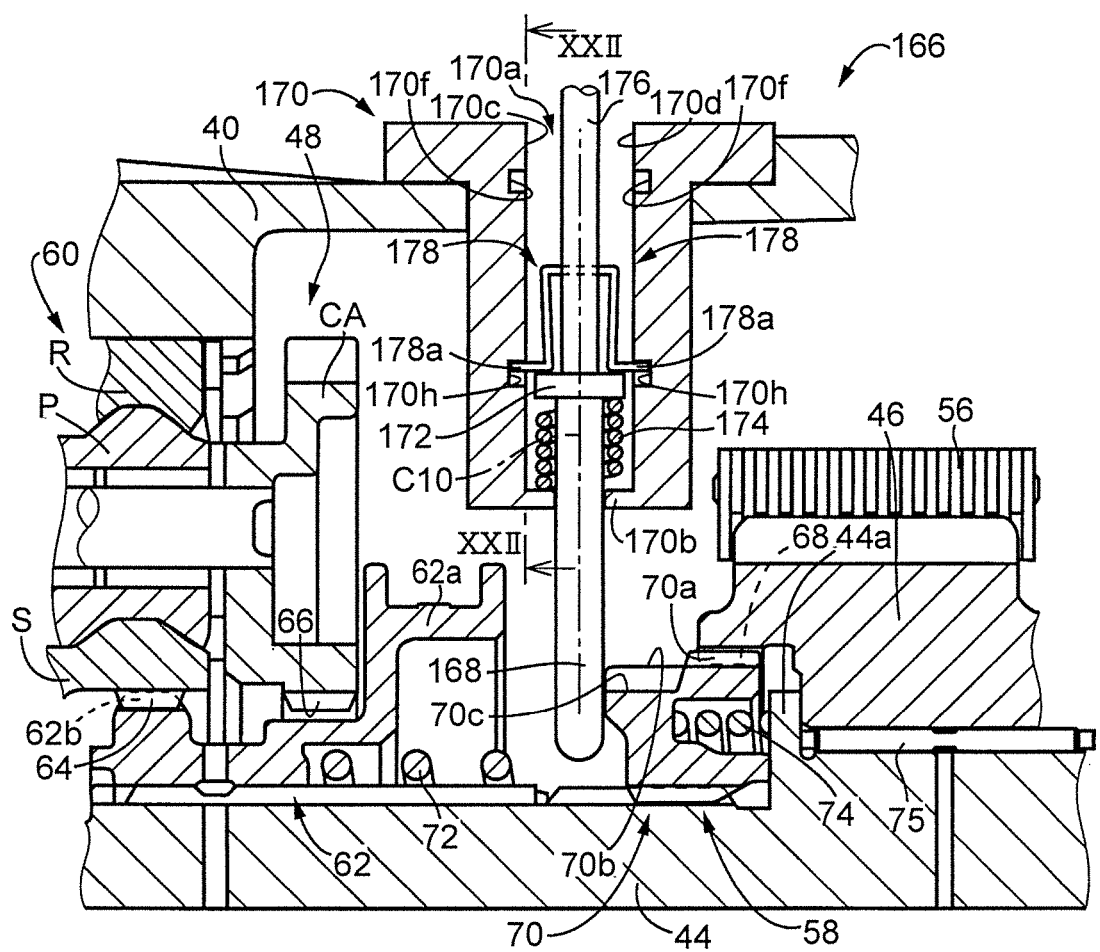
FIG. 21 is view of a state in which the locking sleeve is moved toward a output member side by a pushpin provided in the second locking sleeve driving mechanism shown in FIG. 19.

Also, when switching from 4WD to 2WD, the pushpin 168 returns to the state shown in FIGS. 19 and 20 from the state shown in FIGS. 21 and 22 by the urging force of the spring 174 when the engaging portion 178a is moved by the second pressing operation of the operating shaft member 176. Then, similar to the first example embodiment, the locking sleeve 70 is moved in the direction away from the drive gear 46 by the urging force of the second spring 74, such that the transfer 22 switches from 4WD to 2WD.

As described above, according to this example embodiment, the second locking sleeve driving mechanism 166 includes the spring 174 that urges the pushpin 168 in the opposite direction from the direction toward the locking sleeve 70, and the pushpin 168 is provided so as to be able to be operated manually from outside the transfer case 40. Therefore, the pushpin 168 is made to engage with the cam groove 70c formed on the locking sleeve 70 by manually operating the pushpin 168 via the operating shaft member 176, and when the operation is cancelled, the pushpin 168 returns in the direction away from the cam groove 70c by the urging force of the spring 174. Therefore, with the second locking sleeve driving mechanism 166, an actuator does not need to be used, so the second locking sleeve driving mechanism 166 can be suitably smaller.

Heretofore, example embodiments of the present disclosure have been described in detail with reference to the drawings, but the present disclosure may also be applied in other forms.

For example, in the example embodiment described above, a ball screw is given as an example of the screw mechanism 86, but the screw mechanism 86 is not limited to this. For example, as long as the screw mechanism 86 is a conversion mechanism that converts the rotational motion of the motor 84 into linear motion, the screw mechanism 86 may also be a mechanism such as a shaft of a simple bolt combined with a nut, for example. More specifically, the screw mechanism 86 may be a slip screw or the like. When the screw mechanism 86 is a slip screw, the mechanical efficiency with which rotational motion is converted into linear motion is lower than it is with a ball screw, but certain effects, such as that high thrust is able to be applied to the front-wheel drive clutch 50, and the stroke necessary to operate the high-low switching mechanism 48 is able to be obtained, are able to be obtained.

Also, in the example embodiment described above, the screw mechanism 86 is indirectly connected to the electric motor 84 via the worm gear 90, but the screw mechanism 86 is not limited to this. For example, the threaded shaft member 92 of the screw mechanism 86 and the electric motor 84 may be directly connected without using the worm gear 90. More specifically, the threaded shaft member 92 and the electric motor 84 may be directly connected such that a pinion provided on the motor shaft of the electric motor 84 is in mesh with gear teeth formed on the threaded shaft member 92.

Further, in the example embodiment described above, an FR-based four-wheel drive vehicle is given as an example of the vehicle 10 to which the transfer 22 is applied, but the vehicle 10 to which the transfer 22 is applied is not limited to this. For example, the vehicle 10 to which the transfer 22 is applied may also be a front engine front wheel drive (FF)-based four-wheel drive vehicle. Also, the front-wheel drive clutch 50 is described as being a multiple disc clutch, but the present disclosure may also be applied when the front-wheel drive clutch 50 is a single disc clutch. Further, the transfer 22 does not have to be provided with the gear position maintaining mechanism 120 and the low gear position detection switch 130.

Further, in the example embodiments described above, an internal combustion engine such as a gasoline engine or a diesel engine, for example, may be used as the engine 12 that given as an example of the driving force source. Also, another prime mover such as an electric motor, for example, may be used either alone or in combination with the engine 12, as the driving force source. Further, the transmission 20 is any one of a variety of automatic transmissions such as a planetary gear type stepped transmission, a continuously variable transmission (CVT), or a synchronous mesh twin shaft parallel axis-type automatic transmission (including a known DCT), or a known manual transmission. Also, the front-side clutch 36 is described as being an electromagnetic dog clutch, but the front-side clutch 36 is not limited to this. For example, the front-side clutch 36 may also be a type of friction clutch or a dog clutch that is provided with a shift fork that moves the sleeve in the axial direction, in which the shift fork is driven by an electrically controllable or hydraulically controllable actuator, or the like.

Also, in the example embodiments described above, the pair of first and second solenoids 142 and 144 and the solenoid 164 are described as the actuator to selectively control the movement of the pushpin 136 and 156, but another actuator, e.g., a hydraulic apparatus, may also be used. Also, in the example embodiment illustrated in FIG. 17 described above, the spring 162 is provided in the second locking sleeve driving mechanism 154, but this spring 162 may be omitted and the pushpin 156 may be moved in a direction toward the locking sleeve 70 or a direction away from the locking sleeve 70 by connecting the pushpin 156 to the shaft member 164a and switching the solenoid 164 ON/OFF. Also, in the second locking sleeve driving mechanism 154 of the example embodiment described above, the pushpin 156 is moved by the shaft member 164a of the solenoid 164, but a lever may also be provided between the shaft member 164a and the pushpin 156, and the pushpin 156 may be moved via this lever, for example.

The example embodiments described above are no more than example embodiments. That is, the present disclosure may be carried out in modes that have been modified or improved in any of a variety of ways based on the knowledge of one skilled in the art.

What is claimed is:

1. A transfer for a four-wheel drive vehicle, comprising:
   a case;
   an input shaft that is supported by the case so as to rotate with respect to the case;
   a output shaft that is supported, concentric with the input shaft, by the case so as to rotate with respect to the case, the output shaft configured to output power to first left and right driving wheels;
   a output member that is supported concentric with the output shaft so as to rotate relatively with respect to the output shaft, the output member configured to output power to second left and right driving wheels;
   a friction clutch configured to transmit some of the power of the output shaft to the output member;
   an actuator;
   a pressing mechanism configured to apply engaging force to the friction clutch by output of the actuator;
   a locking sleeve that is arranged relatively non-rotatable with respect to the output shaft, the locking sleeve configured to move in a first axial direction along an axis of the output shaft with respect to the output shaft, the locking sleeve configured to selectively connect to the output member by moving in the first axial direction, an outer peripheral surface of the locking sleeve including a cam groove such that a groove width of the cam groove in a rotational direction of the locking sleeve decreases from the output shaft toward the output member;

a first locking sleeve driving mechanism configured to drive the locking sleeve toward the output member side by the output of the actuator; and a second locking sleeve driving mechanism configured to move the locking sleeve independently of the actuator and the first locking sleeve driving mechanism, the second locking sleeve driving mechanism including a pushpin, the pushpin configured to move in a second axial direction that is perpendicular to the first axial direction and engage with the cam groove, the pushpin configured to move the locking sleeve toward the output member side as the locking sleeve rotates when the pushpin is engaged with the cam groove.

2. The transfer according to claim 1, wherein the actuator is an electric motor;

the pressing mechanism includes a ball screw that converts rotational motion of the electric motor to linear motion, and a piston that transmits linear motion force of the ball screw to the friction clutch; and the first locking sleeve driving mechanism includes the ball screw, and a fork shaft and a fork that transmit the linear motion force of the ball screw to the locking sleeve.

3. The transfer according to claim 1, wherein the second locking sleeve driving mechanism includes a spring that urges the pushpin in a direction toward the locking sleeve or a direction opposite the direction toward the locking sleeve, and a second actuator that selectively controls a movement of the pushpin.

4. The transfer according to claim 1, wherein the second locking sleeve driving mechanism includes a spring that urges the pushpin in a direction opposite a direction toward the locking sleeve, and the pushpin is provided so as to be able to be manually operated from outside the case.

5. The transfer according to claim 1, wherein an inclined cam surface formed on the cam groove is inclined such that a groove width in a rotational direction of the locking sleeve of the cam groove becomes larger farther toward an outer periphery in a radial direction of the locking sleeve.

6. The transfer according to claim 1, wherein the locking sleeve receives thrust applied in a locking direction toward the output member side from the first locking sleeve driving mechanism via a first spring, and receives thrust applied in an unlocking direction toward a side away from the output member by a second spring.

7. The transfer according to claim 1, wherein the transfer includes a high-low switching mechanism that changes a rate of rotation input from the input shaft and transmits the resultant rotation to the output shaft; and the first locking sleeve driving mechanism is configured to drive the locking sleeve in conjunction with the driving of the high-low switching mechanism.

* * * * *

UNITED STATES PATENT AND TRADEMARK OFFICE
CERTIFICATE OF CORRECTION

PATENT NO. : 9,994,103 B2
APPLICATION NO. : 15/219905
DATED : June 12, 2018
INVENTOR(S) : Koji Takaira and Takayuki Sugimoto It is certified that error appears in the above-identified patent and that said Letters Patent is hereby corrected as shown below:

In the Specification

In Column 18, Line 29, delete "direct ion" and insert --direction--, therefor.

Signed and Sealed this
Twenty-eighth Day of May, 2019

Andrei Iancu
*Director of the United States Patent and Trademark Office*